(12) United States Patent
Pearce et al.

(10) Patent No.: US 9,489,073 B2
(45) Date of Patent: Nov. 8, 2016

(54) MULTI-POINT CONTACTS WITH PRESSURE DATA ON AN INTERACTIVE SURFACE

(75) Inventors: Nigel Pearce, Lancashire (GB); Kevin Parkes, Lancashire (GB); Barry Smith, Lancashire (GB)

(73) Assignee: Promethean Limited (GB)

(*) Notice: Subject to any disclaimer, the term of this patent is extended or adjusted under 35 U.S.C. 154(b) by 535 days.

(21) Appl. No.: 13/518,244

(22) PCT Filed: Dec. 21, 2009

(86) PCT No.: PCT/EP2009/067680
§ 371 (c)(1),
(2), (4) Date: Nov. 29, 2012

(87) PCT Pub. No.: WO2011/076248
PCT Pub. Date: Jun. 30, 2011

(65) Prior Publication Data
US 2013/0069889 A1    Mar. 21, 2013

(51) Int. Cl.
*G09G 5/00* (2006.01)
*G06F 3/041* (2006.01)
*G06F 3/0488* (2013.01)

(52) U.S. Cl.
CPC .......... *G06F 3/0412* (2013.01); *G06F 3/0416* (2013.01); *G06F 3/04883* (2013.01)

(58) Field of Classification Search
CPC .............. G06F 3/0412; G06F 3/0416; G06F 3/04883; G06F 3/038; G06F 2203/0381; G06F 2203/04808; G06K 9/00375
USPC ........... 345/1.1, 2.1, 3.1, 173–179, 184, 2.2, 345/419, 629
See application file for complete search history.

(56) References Cited

U.S. PATENT DOCUMENTS

| 6,597,347 | B1 | 7/2003 | Yasutake |
| 8,209,628 | B1* | 6/2012 | Davidson ...................... 715/790 |
| 2004/0021643 | A1 | 2/2004 | Hoshino et al. |
| 2004/0150631 | A1 | 8/2004 | Fleck et al. |
| 2009/0237374 | A1 | 9/2009 | Li et al. |

(Continued)

FOREIGN PATENT DOCUMENTS

| EP | 0758769 | 2/1997 |
| EP | 2299351 | 3/2011 |

(Continued)

OTHER PUBLICATIONS

International Preliminary Report on Patentability for Internatonal Patent Application No. PCT/EP2009/067680, mailed Jul. 5, 2012, 10 pages.

(Continued)

*Primary Examiner* — Kent Chang
*Assistant Examiner* — Nelson Rosario
(74) *Attorney, Agent, or Firm* — Brient Globerman, LLC; Kyle M. Globerman

(57) ABSTRACT

There is disclosed a method and apparatus for controlling a software application running on a computer system including an interactive display adapted to detect at least two contact points on the surface of the interactive display, the method comprising: detecting at least two contact points; determining pressure data associated with at least one of said contact points; and defining a condition of the software application in dependence on said detected at least two contact points and said at least one determined pressure value.

13 Claims, 15 Drawing Sheets

(56) References Cited

U.S. PATENT DOCUMENTS

| | | | |
|---|---|---|---|
| 2009/0251489 A1* | 10/2009 | Iijima | G06T 11/60 345/619 |
| 2010/0053107 A1* | 3/2010 | Tsuzaki et al. | 345/173 |
| 2010/0171712 A1* | 7/2010 | Cieplinski et al. | 345/173 |
| 2010/0265255 A1* | 10/2010 | Iwamoto | G06T 11/203 345/442 |

FOREIGN PATENT DOCUMENTS

| | | |
|---|---|---|
| WO | WO 2006/094308 A2 | 9/2006 |
| WO | WO 2008/044024 A2 | 4/2008 |
| WO | WO 2008/085759 A2 | 7/2008 |
| WO | WO 2008/095139 | 8/2008 |
| WO | WO 2011/025845 | 3/2011 |

OTHER PUBLICATIONS

International Search Report prepared by the European Patent Office on Jan. 26, 2011, for International Application No. PCT/EP2009/067680.

Official Action for United Kingdom Patent Application No. GB1212928.4 dated Oct. 22, 2013, 6 pages.

* cited by examiner (a)

(b)

(c)

MULTI-POINT CONTACTS WITH PRESSURE DATA ON AN INTERACTIVE SURFACE

CROSS REFERENCE TO RELATED APPLICATIONS

This application is a national stage application under 35 U.S.C. 371 of PCT Application No. PCT/EP2009/067680 having an international filing date of 21 Dec. 2009, which designated the United States, the entire disclosure of which is incorporated herein by reference.

BACKGROUND TO THE INVENTION

1. Field of the Invention

The present invention relates to an interactive display system having an interactive surface, at which surface at least two contact points can be detected and distinguished between.

2. Description of the Related Art

A typical example of an interactive display system is an electronic whiteboard system. An electronic whiteboard system typically is adapted to sense the position of a pointing device or pointer relative to a working surface (the display surface) of the whiteboard, the working surface being an interactive surface. When an image is displayed on the work surface of the whiteboard, and its position calibrated, the pointer can be used in the same way as a computer mouse to manipulate objects on the display by moving a pointer over the surface of the whiteboard.

A typical application of an interactive whiteboard system is in a teaching environment. The use of interactive whiteboards improves the teaching productivity and also improves student comprehension. Such whiteboards also allow use to be made of good quality digital teaching materials, and allow data to be manipulated and presented using audio visual technologies. A typical construction of an electronic whiteboard system comprises an interactive display forming the electronic whiteboard, a projector for projecting images onto the display, and a computer system in communication with the electronic whiteboard for generating the images for projection, running software applications associated with such images, and for processing data received from the display associated with pointer activity, such as the location of the pointer on the display surface. In this way the computer system can control the generation of images to take into account the detected movement of the pointer on the interactive surface.

It is known in the art of interactive display systems to adapt an interactive surface to allow detection of the presence of two contact points at an interactive surface and to distinguish between them. The ability to detect and distinguish between two contact points allows for the control of an interactive display system to be improved. An example of such an improved interactive display system is described in United Kingdom Patent Application Publication No. 2443010 in the name of Promethean Limited.

It is an aim of the invention to provide improvements to an interactive display system including an interactive surface which is adapted to detect and distinguish the presence of at least two contact points on the interactive surface.

SUMMARY OF THE INVENTION

In one aspect the invention provides a method of controlling a software application running on a computer system including an interactive display adapted to detect at least two contact points on the surface of the interactive display, the method comprising: detecting at least two contact points; determining pressure data associated with at least one of said contact points; and defining a condition of the software application in dependence on said detected at least two contact points and said at least one determined pressure value.

The method may further comprise determining pressure data associated with said at least two contact points, and defining a condition of the software application further in dependence on said at least two determined pressure values.

The method may further comprise detecting position data of at least one contact point, and defining the condition of the software application further in dependence on said the position data of the at least one contact point. The method may further comprise detecting position data of the at least two contact points, and defining the condition of the software application further in dependence on said the position data of the at least two contact points. The method may further comprise determining control data associated with at least one contact point, and defining the condition of the software application further in dependence on said control data of the at least one contact point. The method may further comprise detecting control data associated with the at least two contact points, and defining the condition of the software application further in dependence on the control data of the at least two contact points.

The control data may be derived from a pointing device providing the contact point. The control data may be derived from the state of a switch of the pointing device. The control data may be selection data.

The condition may define a pivot point and a selected object is rotated by movement of the other contact point. The condition may cause a selected image to be flipped. The condition may cause a selected image to split in two. The condition may cause a selected image to be cropped.

The method may further comprise: defining an active region extending from each contact point, the size of each active region being dependent upon the detected pressure at the contact points; detecting an overlap of the defined active regions; and enabling a software function in dependence upon the detected overlap.

The step of detecting the overlap may further include determining the size of the overlap, wherein the step of enabling a software function comprises enabling one of a plurality of software functions in dependence on detecting the overlap and the size of the overlap.

Each active region may be a physical region of the display. The physical region may be a circular region having a centre point at the respective contact point. The radius of the circular region may be proportional to the pressure detected at the contact point. An increase in detected pressure may cause a proportional increase in the radius. A decrease in detected pressure may cause a proportional decrease in the radius. Each active region may be a path extending from the contact point. The path may define a set of one or more control points. The set of control points may include a main control point at the contact point. The set of control points may include one or more control points adjacent the main control point. The set of control points may include a number of control points adjacent to the main control point which is proportional to the pressure applied at the contact point. As the pressure detected increases, the next adjacent control point may be included in the set.

An area may be defined by the value of the detected pressure, any control points within said area being included within the set.

Each control point may be associated with a data set. Each data set and associated control points in a common area may be highlighted or selected.

Control points in a common area may have a common software action applied thereto.

The contact points may be geographical locations, and the common area defines one or more intermediate locations, the software application being adapted to display routes from each of the contact point locations to one or more intermediate locations.

The method may further comprise wherein the effect of a detected pressure value at one contact point is dependent upon the pressure value at the other contact point.

The ability to act on the pressure value from the one contact point may be dependent upon the pressure value at the other contact point.

The method may further comprise: displaying a Bezier curve on the display, including displaying two control points of the Bezier curve; detecting a contact point at each of said control points; detecting a pressure value at each of said control points; and varying the control points in dependence on the respective detected pressure.

The method may further comprise: detecting selection of a data set associated with each contact point; detecting a pressure value at each contact point; determining one or more further data sets associated with at least one of each data set and identifying the ones of the one or more further data sets having data corresponding to the first data set, wherein the determination as to whether data corresponds is dependent upon the pressure value.

Each data set may include a plurality of data values, the amount of data values required to match in order for the data sets to correspond being proportional to the amount of pressure detected.

The interactive display my be adapted to detect the position of at least one further contact point on the surface, the method further comprising: detecting selection of a first data set associated with the further contact point; detecting a pressure value at the further contact point; determining one or more further data sets associated with the first data set and identifying the ones of the one or more further data sets having data corresponding to the first data set, wherein the determination as to whether data corresponds is dependent upon the pressure value.

The method may further comprise determining a common data set associated with the first and second contact points.

The method may further comprise: selecting an object displayed in dependence on the at least two contact points being coincident with said object; detecting a pressure value from at least one of the contact points and manipulating said object in dependence thereon. Said object may be rotated by an amount proportional to the detected pressure. Said object may rotate in a different direction in dependence upon the one of the contact points for which pressure is detected.

The method may further comprise detecting the pressure value from the at least two contact points, wherein the object is rotated about a central point thereof, the direction of rotation being determined in dependence upon the contact point at which pressure is detected.

The method may further comprise: detecting the selection of two colour options at the at least two contact points; detecting pressure values at the at least two contact points; generating a colour by mixing the selecting colours in a ratio determined by the pressure values at the respective contact points.

In an aspect the invention provides a method of controlling a software application running on a computer system including an interactive display adapted to detect the position of at least one contact point on the surface of the interactive display, the method comprising: detecting a pressure value at the at least one contact point; monitoring the pressure value at the at least one contact point; and responsive to a pressure value being constant for a predetermined period of time, setting a software state.

The software state may be a software function or value. The software state may be set to a value associated with the value of pressure detected for the predetermined time. The pressure value may be proportional to the value set. Setting the software state may comprise releasing the software state from a current set value. Setting the software state may comprise detecting a value of pressure for the predetermined time which is proportional to the current set value.

In an aspect there is provided a computer program adapted to perform, when run on a computer, any stated method. In an aspect there is provided a computer program product adapted to store computer program code.

In a still further aspect there is provided a computer system for controlling an interactive display, the interactive display adapted to detect at least two contact points on the surface thereof, wherein the interactive display is adapted to detect at least two contact points on the surface thereof, and wherein the computer system is adapted to determine pressure data associated with at least one of said contact points; and define a condition of a software application running on the computer system in dependence on said detected at least two contact points and said at least one determined pressure value.

The computer system may be further adapted to determine pressure data associated with said at least two contact points, and define a condition of the software application further in dependence on said at least two determined pressure values.

The computer system may be further adapted to detect position data of at least one contact point, and defining the condition of the software application further in dependence on said the position data of the at least one contact point.

The computer system may be further adapted to detect position data of the at least two contact points, and define the condition of the software application further in dependence on said the position data of the at least two contact points.

The computer system may be further adapted to determine control data associated with at least one contact point, and define the condition of the software application further in dependence on said control data of the at least one contact point.

The computer system may be further adapted to detect control data associated with the at least two contact points, and define the condition of the software application further in dependence on the control data of the at least two contact points.

The control data may be derived from a pointing device providing the contact point. The control data may be derived from the state of a switch of the pointing device. The control data may be selection data. The condition may define a pivot point and a selected object is rotated by movement of the other contact point. The condition may cause a selected image to be flipped. The condition may cause a selected image to split in two. The condition may cause a selected image to be cropped.

The computer system may be further adapted to define an active region extending from each contact point, the size of each active region being dependent upon the detected pressure at the contact points; and to detect an overlap of the defined active regions; and to enable a software function in dependence upon the detected overlap.

The computer system may be adapted to detect the overlap by determining the size of the overlap, and adapted to enable a software function by enabling one of a plurality of software functions in dependence on detecting the overlap and the size of the overlap.

Each active region may be a physical region of the display. The physical region may be a circular region having a centre point at the respective contact point. The radius of the circular region may be proportional to the pressure detected at the contact point. A increase in detected pressure may cause a proportional increase in the radius. A decrease in detected pressure may cause a proportional decrease in the radius. Each active region may be a path extending from the contact point. The path may define a set of one or more control points. The set of control points may include a main control point at the contact point. The set of control points may include one or more control points adjacent the main control point.

The set of control points may include a number of control points adjacent to the main control point which is proportional to the pressure applied at the contact point. As the pressure detected increases, the next adjacent control point may be included in the set. An area may be defined by the value of the detected pressure, any control points within said area being included within the set. Each control point may be associated with a data set. Data within each data set and associated with control points in a common area may be highlighted or selected. Control points in a common area may have a common software action applied thereto.

The contact points may be geographical locations, and the common area defines one or more intermediate locations, the software application being adapted to display routes from each of the contact point locations to one or more intermediate locations.

The computer system may be further adapted such that the effect of a detected pressure value at one contact point is dependent upon the pressure value at the other contact point.

The ability to act on the pressure value from the one contact point may be dependent upon the pressure value at the other contact point.

The computer system may be further adapted to: display a Bezier curve on the display, including controlling the display of two control points of the Bezier curve; detect a contact point at each of said control points; detect a pressure value at each of said control points; and vary the control points in dependence on the respective detected pressure.

The computer system may be further adapted to: detect selection of a data set associated with each contact point; detect a pressure value at each contact point; determine one or more further data sets associated with at least one of each data set and identify the ones of the one or more further data sets having data corresponding to the first data set, wherein the determination as to whether data corresponds is dependent upon the pressure value.

Each data set may include a plurality of data values, the amount of data values required to match in order for the data sets to correspond being proportional to the amount of pressure detected.

The interactive display may be adapted to detect the position of at least one further contact point on the surface, the computer system further being adapted to: detect selection of a first data set associated with the further contact point; detect a pressure value at the further contact point; determine one or more further data sets associated with the first data set and identify the ones of the one or more further data sets having data corresponding to the first data set, wherein the determination as to whether data corresponds is dependent upon the pressure value.

The computer system may be further adapted to determine a common data set associated with the first and second contact points.

The computer system may be further adapted to: select an object displayed in dependence on the at least two contact points being coincident with said object; detect a pressure value from at least one of the contact points and manipulating said object in dependence thereon.

Said object may be rotated by an amount proportional to the detected pressure. Said object may rotate in a different direction in dependence upon the one of the pens for which pressure is detected.

The computer system may be further adapted to detect the pressure value from the at least two contact points, wherein the object is rotated about a central point thereof, the direction of rotation being determined in dependence upon the contact point at which pressure is detected.

The computer system may be further adapted to: detect the selection of two colour options at the at least two contact points; detect pressure values at the at least two contact points; generate a colour by mixing the selecting colours in a ratio determined by the pressure values at the respective contact points.

In another aspect the invention provides a computer system for controlling an interactive display adapted to detect the position of at least one contact point on the surface thereof, the computer system adapted to: detect a pressure value at the at least one contact point; monitor the pressure value at the at least one contact point; and responsive to a pressure value being constant for a predetermined period of time, set a software state.

The software state may be a software function or value. The software state may be set to a value associated with the value of pressure detected for the predetermined time. The pressure value may be proportional to the value set. Setting the software state may comprise releasing the software state from a current set value. Setting the software state may comprise detecting a value of pressure for the predetermined time which is proportional to the current set value.

BRIEF DESCRIPTION OF THE FIGURES

The invention will now be described by way of example with reference to the accompanying figures, in which.

DESCRIPTION OF THE PREFERRED EMBODIMENTS

The invention is now described by way of reference to various examples and embodiments, and advantageous applications. One skilled in the art will appreciate that the invention is not limited to the details of any described example or embodiment. In particular the invention is described with reference to an exemplary interactive display system, and one skilled in the art will appreciate that the principles of the invention are not limited to the specifics of such a described system.

Figure 1:
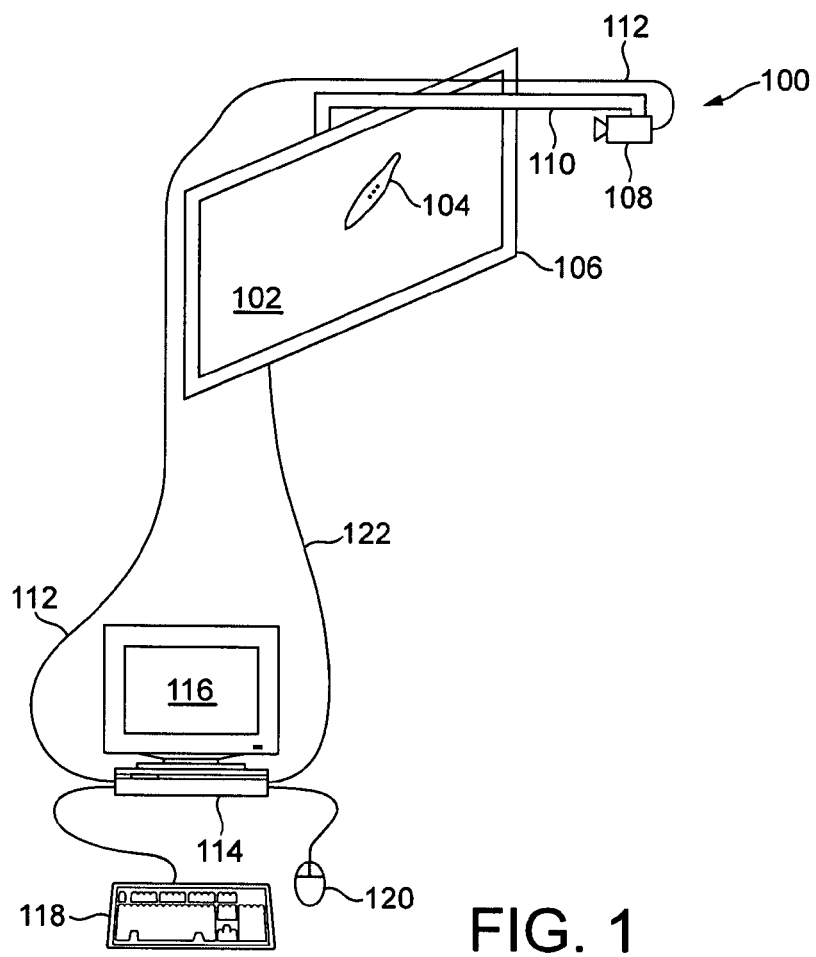
FIG. 1 illustrates the main elements of a typical known interactive display system.

With reference to FIG. 1, an exemplary interactive display system 100 comprises: a whiteboard assembly arrangement generally designated by reference numeral 106, and including an interactive display surface 102; a projector 108; and a computer system 114. The projector 108 is attached to a fixed arm or boom 110, which extends perpendicularly from the surface of the whiteboard 106. One end of the boom 110 supports the projector 108 in a position in front of the display surface 102, and the other end of the boom 110 is fixed to the whiteboard 106, a frame associated with the whiteboard 106, or a wall on which the whiteboard 106 is mounted. The computer 114 controls the interactive display system. A computer display 116 is associated with the computer 114. The computer 114 additionally is provided with a keyboard input device 118 and a mouse input device 120. The computer 114 is connected to the whiteboard 106 by a communication link 122 to receive data from the display surface 102, and is connected to the projector 108 by a communication link 112 in order to provide display images to the projector. Shown in FIG. 1 is a pointing device 104, which is used to provide inputs at the display surface 102.

In other interactive display surfaces the display surface 102 may be a touch-sensitive surface.

As is known in the art, the computer 114 controls the interactive display system to project images via the projector 108 onto the interactive display surface 102. The position of the pointing device 104 is detected by the interactive display surface 102, and location information returned to the computer 114. The pointing device 104 operates in the same way as a mouse to control the displayed images.

In an exemplary interactive display system in which the pointing device 104 is a pen-type device, the position of the pen relative to the interactive surface may be determined based on an electromagnetic interaction between the pointing device 104 and the interactive surface 102. An example of such an interactive display system can be found in European Patent No. 0670694 in the name of Promethean Limited.

Figure 2:
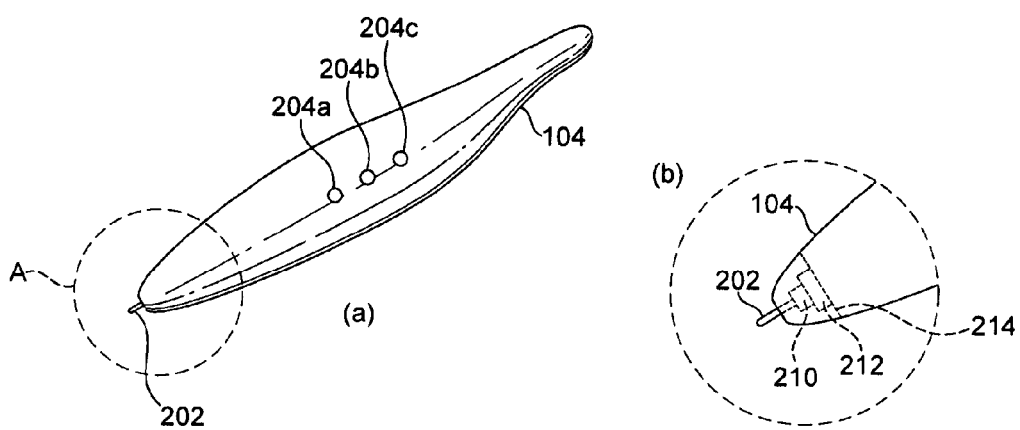
FIGS. 2(a) and 2(b) illustrate an example of a pointing device for use with an interactive surface, incorporating pressure sensing means.

An exemplary pointing device 104 for an electromagnetic arrangement is illustrated in FIG. 2a. The pointing device 104 has a body generally provided in a pen-shape. The pointing device has a tip 202 which contacts, in use, the interactive surface. The pointing device 104 may be provided with a number of buttons 204, in the illustrated example three buttons 204a to 204c. In use a user may depress one or more of the buttons 204, in order to provide control data. The depression of one or more of the buttons 204 is detected by the interactive surface. Adaptation of the interactive surface to allow detection of the depression of such buttons is well-known in the art. The depression of the buttons may adjust the resonant frequency of a coil contained within the pointing device 104, or may adjust the Q-factor of the resonant circuit as described in European Patent No. 0607694.

In embodiments of the invention, such a pointing device may be further adapted as illustrated in FIG. 2b. FIG. 2b shows a cross section through a portion of the pointing device denoted by circle A in FIG. 2a. The contact point 202 of the pointing device 104 has a base 210 located within the pointing device 104 housing, which rests against a pressure sensitive material 212. The pressure sensitive material 212 sits on a fixed abutment means denoted by reference numeral 214. In use, as the contact point 202 is pressed against the interactive surface, the base 210 presses against the pressure sensitive material 212. The pressure sensitive material 212 is able to detect the applied pressure. As the user presses the pointing device 104 harder against the interactive surface, the applied pressure increases. Thus the pressure sensitive material 212 is able to provide information as to the applied pressure between the pointing device and the interactive surface. This pressure data may be relayed to the computer system of the interactive display system, by electromagnetic induction, and processed.

A prior art example of a pen with pressure detection means included in it is the pen provided with the Wacom Graphics Tablet product. Other pressure detection techniques may be utilised, and the invention is not concerned with the implementation of a pressure detection technique in a pointing device.

The invention, and it's embodiments, is not limited to the use of a particular mechanism provided in a pointing device for detecting applied pressure at a contact point. Further, the applied pressure may be sensed with a pressure sensing mechanism provided in the interactive display surface. The invention is not limited to any mechanism for detecting or measuring pressure applied at a contact point on the interactive surface. Where pressure is sensed utilising a pointing device including a pressure sensing mechanism, a mechanism must be provided to communicate the pressure information to the computer system controlling the interactive display. This may be, for example, through a dedicated communication between the pointing device and the computer, or by transferring the data associated with the detected pressure by encoding information which is detected by the interactive surface.

In accordance with embodiments of the invention, in an interactive display system including an interactive surface adapted to detect and distinguish two or more contact points, pressure data associated with at least one of the contact points is used to define a condition, state or function of a software application controlling the display of images on the interactive display surface. The condition, state or function of the software application may be an action of the software application.

In the following description preferred embodiments of the invention are described in the context of an interactive display system including an interactive display surface and electromagnetic pointing device including pressure sensing/detection means. However the invention and its embodiments are not limited to such an arrangement. The invention may apply to other types of interactive surface than ones employing electromagnetic pointing means. For example the invention may apply to interactive display systems which use interactive display systems which are touch-sensitive, and which may sense the touch of a user's finger for example. It follows that the invention and its embodiments are also not limited to the detection or sensing of applied pressure in a pointing device. In an alternative, the interactive display surface may be adapted to allow for detection of pressure, as described with reference to FIG. 3.

Figure 3:
FIG. 3 illustrates an example of an interactive surface incorporating pressure sensing means.

In FIG. 3 there is illustrated a cross-section through an interactive display surface 300 which includes a layer 306 comprising a wire grid, for detecting the presence of an electromagnetic pen on the surface of the interactive display in accordance with known techniques. On a surface of the wire grid layer 306 is positioned a layer of pressure sensitive material denoted by reference numeral 304. On top of the layer of pressure sensitive material 304 is located a surface layer 302, which provides a working layer for a user. In such an arrangement, when a pointing device 104 is positioned on the top of the working surface 302, the wire-grid 306 is controlled to detect the position of the pointing device. In addition the pressure sensitive layer 304 is adapted to detect applied pressure at the contact point. Such arrangements of an interactive display surface including a pressure sensitive material are known in the art. It should be noted that such an arrangement is not limited to an electromagnetic sensing surface in combination with a pressure sensitive material. For example, a touch-sensitive surface may be provided in combination with a pressure sensitive material.

Pressure sensitive materials are known. One example utilises Quantum tunneling composite pressure sensing material. The invention is not concerned with the implementation of a pressure sensitive material at the interactive surface.

In a preferred embodiment, the invention allows for the control of a software application running on the computer system 114 of the interactive display system 100, including the interactive display 102. The interactive display 102 is adapted to detect at least two contact points on its surface. Pressure data associated with at least one of the contact points is detected and determined. A condition of the software application is then defined in dependence on the detected at least two contact points and the at least one determined pressure value.

A preferred embodiment of the invention is now described with reference to the flow process of FIG. 4.

In a step 402, a "multi-point contact and pressure" mode is enabled. This mode may be enabled by, for example, the user selecting a software function on the display surface, or the mode may automatically be enabled by a software application running on the computer system.

With the mode of operation enabled, in a step 404 the software application monitors contact points at the interactive surface. In a step 406 the software application determines whether a contact is detected at two or more points. If contact is not detected at two or more points, then the process reverts to step 404. If contact is detected at two or more points in step 406, then the process moves on to step 408.

In step 408, the pressure data at one or more of the contact points is determined. In one embodiment the pressure data at all contact points is determined, and then the pressure data which is required is processed at a further point in the process flow. Alternatively the pressure data may be determined only after it is determined for which contact points the pressure data is required. In general, pressure data is required for at least one of the multiple contact points. In an embodiment, pressure data associated with at least two contact points is determined, and any condition of the software application is defined in dependence upon the two determined pressure values in conjunction with detection of two contact points.

In an embodiment, position data of one or more of the contact points is also determined, and used in defining the condition of the software application. Preferably, the position data of the at least two contact points is used. Therefore in a step 410 it is optionally determined whether position dependent functionality is enabled. This may be enabled automatically, or may be enabled in dependence upon user selection or user preferences. If the position dependent functionality is enabled, then in a step 412 position data associated with one or more of the contact points is retrieved. The determination of position data in an interactive display system is well-known in the art.

After optional retrieval of the position data in step 412, or if position dependent functionality is not enabled in step 410, then the process flow moves on to step 414. In embodiments control data associated with one or more of the contact points may be additionally used to define the condition of the software application. Control data associated with a contact point may, for example, be derived from a pointing device such as an electromagnetic pointing device used on the interactive surface. The control data may indicate the state of one or more switches provided on the pointing device.

In step 414 it is optionally determined whether or not control data dependent functionality is enabled. As previously, this functionality may be enabled automatically, or may be selectively enabled by a user or by a software application. If control data dependent functionality is enabled then in a step 416 control data associated with a contact point is retrieved. The obtaining of control data from the contact points is well understood by one skilled in the art.

After retrieval of the control data in step 416, or if control data functionality is determined as not being enabled in step 414, the process flow moves on to step 418.

In step 418, it is determined whether "multi-point pressure" functionality is enabled.

If multi-point pressure functionality is enabled, then in step 420 an appropriate condition of the software, or software function, is applied in dependence on multiple pressure values.

In the event that multi-point pressure functionality is not enabled, then a condition of the software application is to be defined in dependence on only a single pressure value from the two or more contact points. In such a scenario, there are multiple possibilities that have a contact point providing the pressure value as selected. It can be understood that every contact point has a pressure value associated therewith, and that for contact points which are not equipped to provide instantaneous pressure values the pressure value may be considered to be zero or have a 'don't care' state, or be below a nominal threshold at which a pressure value is detected. Any implementation will in some way allocate a pressure value state to a contact point which is not arranged to provide a pressure value.

In a step 422, data identifying the sequence of contact points is optionally retrieved. In certain modes of operation, this enables the process to obtain information identifying the order in which contact points were detected on the interactive surface. This may be necessary where, for example, the order in which contact points are detected is used to define the software function.

In a step 424 it is determined whether a contact sequence mode is enabled. If contact sequence mode is enabled, then the data identifying the sequence of contact points retrieved in step 422 is used in a step 436. Step 436 applies a function, or defines a condition of the software application, in dependence upon the pressure value associated with the first contact point when multiple contact points are detected. Alternatively a pressure value from a different contact point in the sequence may be used in a predetermined manner.

If the contact sequence mode is determined not to be enabled in step 424, then in a step 426 it is determined whether there is at least one pressure value which is non-zero. If there are no pressure values which are non-zero, then in a step 430 the software function is defined on the basis that the pressure value is zero.

The definition of a non-zero pressure value may vary according to an implementation. A non-zero pressure value may be attributed to any contact point which is associated with a pressure value (i.e. which is arranged to provide a pressure value); any contact point which has a pressure value above or below a threshold; any contact point which is measured to be non-zero; or any contact point for which a pressure value can be measured.

If it is determined in step 426 that there is at least one pressure value which is non-zero, in step 428 it is determined whether there is more than one pressure value which is non-zero.

If there is not more than one pressure value which is non-zero, then in step 432 the function is applied, or the condition of the software defined, in dependence upon the non-zero pressure value.

If in step 428 it is determined that there is more than one pressure value which is non-zero, then in a step 434 it is the sequence information received in step 422 that is used to apply the pressure value associated with the first, in sequence, non-zero contact point, to define the state of the software application in accordance with that pressure value.

One skilled in the art will appreciate that various modifications and alternatives of the above may be implemented, and all embodiments described may be implemented separately or in any combination.

Example embodiments for defining a function of a software application in accordance with the principles of the invention and its embodiments are now described.

With reference to FIGS. 5 to 8 there is illustrated example implementations in accordance with the invention in which a software application is controlled in dependence upon detecting the presence of two contact points on the interactive surface, and receiving pressure data associated with one of the contact points. In general, however, the invention extends to detecting n contact points, and n or less associated pressure values.

Figure 4:
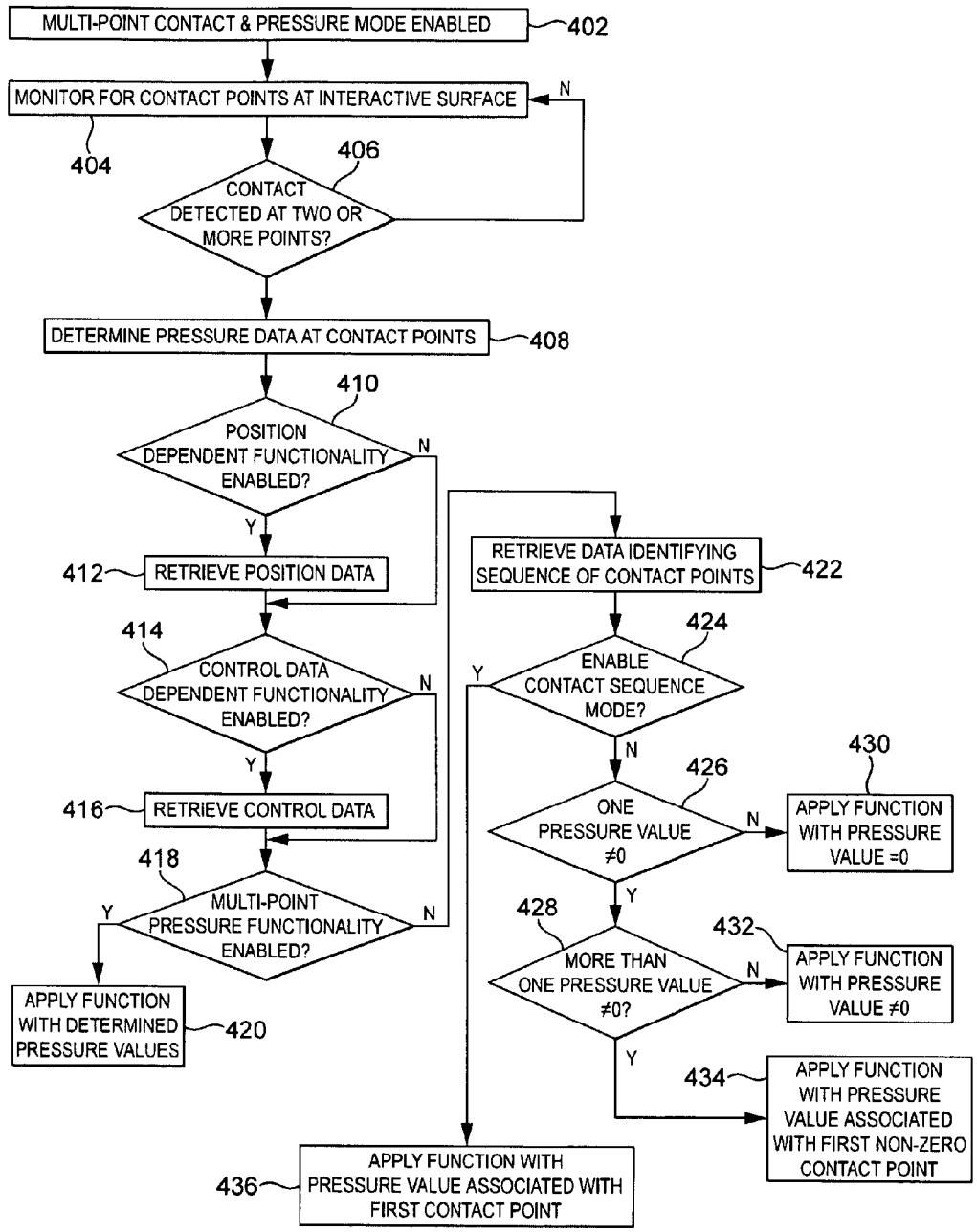
FIG. 4 illustrates a flow process for detection of the presence of two contact points at an interactive surface in combination with a pressure value associated with at least one contact point in accordance with an embodiment of the invention.
Figure 5:
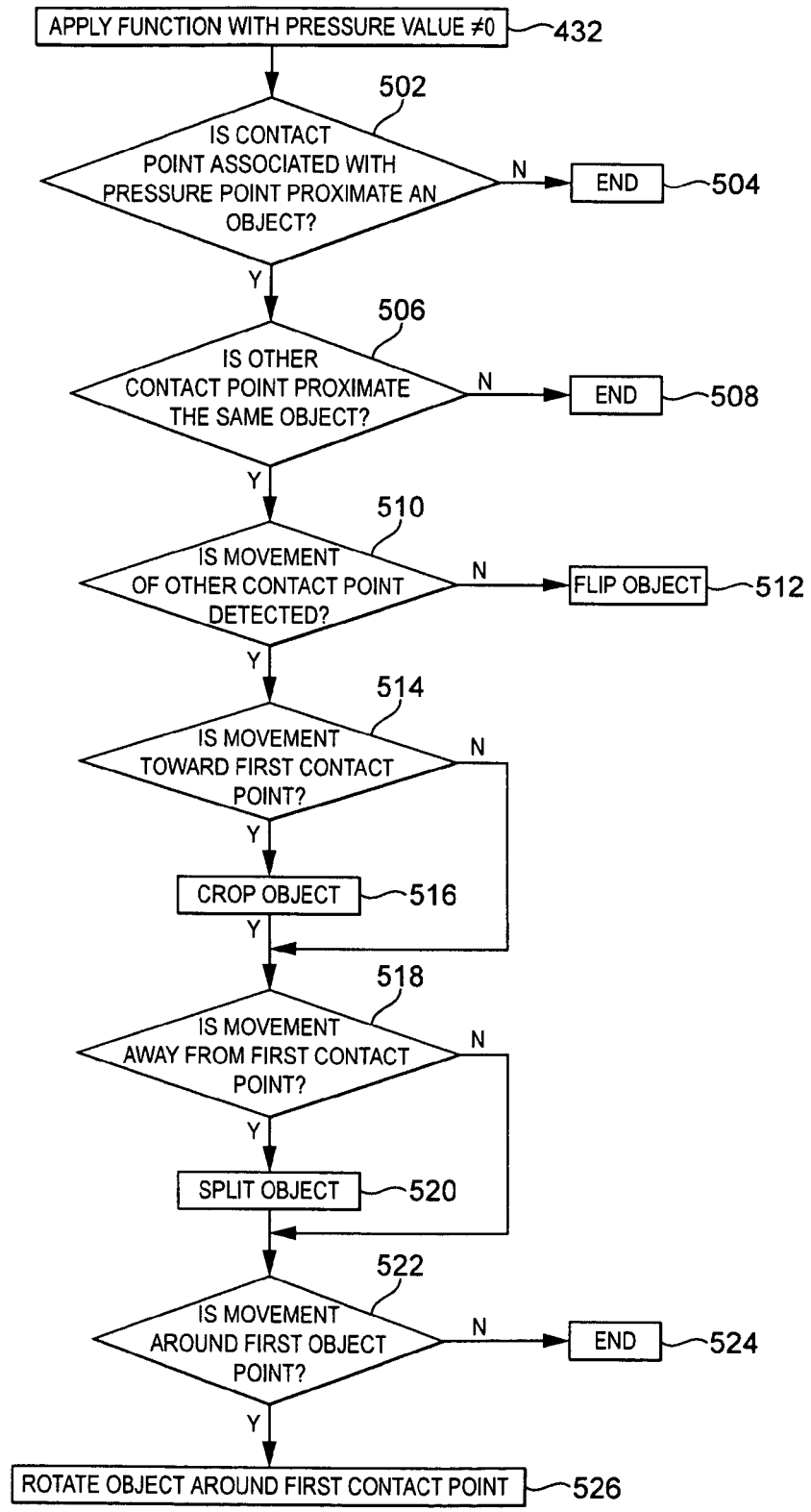
FIG. 5 illustrates an example flow process for manipulating an object displayed on the interactive surface responsive to detection of two contact points on the interactive surface and a pressure value associated with one contact point.

With reference to the flow process of FIG. 5, the flow begins from step 432 of FIG. 4, in which it is determined that a function is to be applied with a pressure value which is non-zero.

In step 502 it is determined if the contact point associated with the pressure point is proximate to an object. If it is not, then in a step 504 the process ends. If it is, then the process moves on to a step 506.

In step 506 it is determined whether the other contact point is proximate the same object. If it is not then in step 508 the process ends. If it is then the process proceeds to step 510.

It should be noted that in the preferred embodiment in steps 502 and 506 it is preferably determined whether the first and second contact points are coincident with the same object.

In step 510 it is determined whether the second contact point is moving. If the second contact point is not moving, then in a step 512 a software function is implemented in order to flip the object.

If it is determined in step 510 that the second contact point is moving, then in step 514 it is determined whether the movement is toward the first contact point. If the movement is toward the first contact point, then in step 516 the object is cropped.

Figure 6:
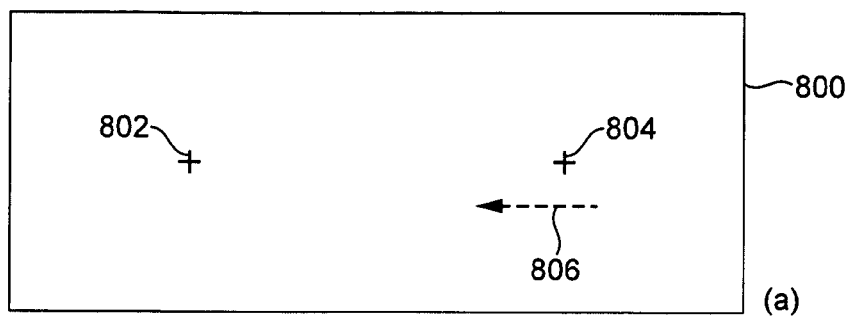
FIGS. 6(a) to 6(f) illustrate an exemplary manipulation of a displayed object in an embodiment of the invention.
Figure 6:
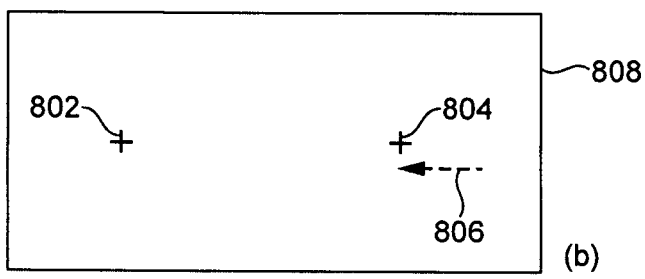
Figure 6:
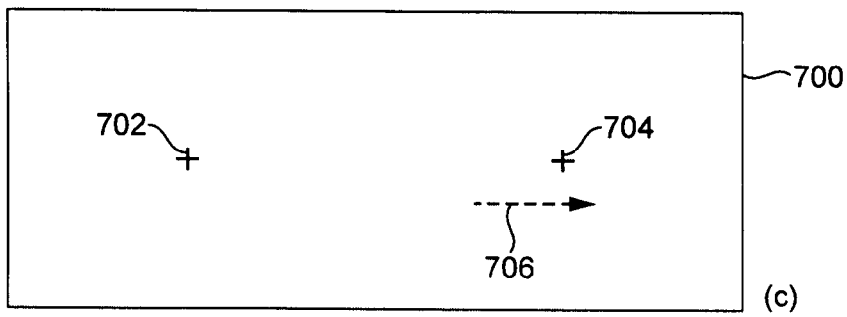
Figure 6:
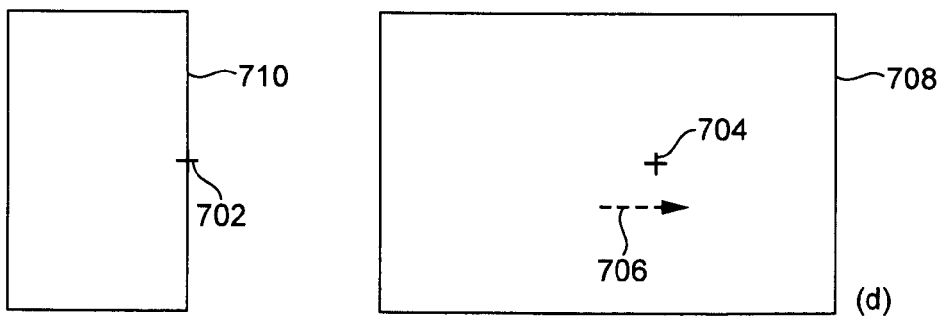
Figure 6:
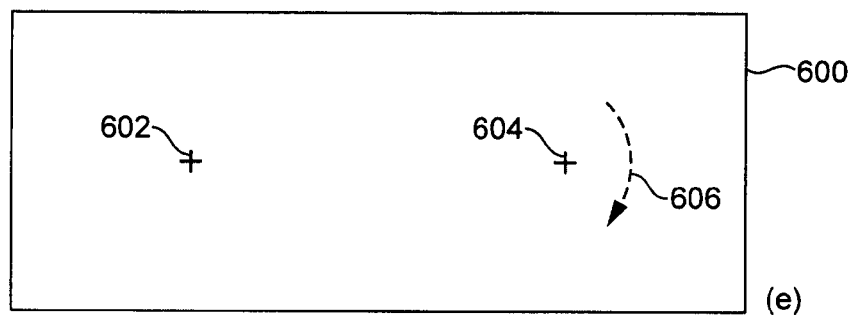
Figure 6:
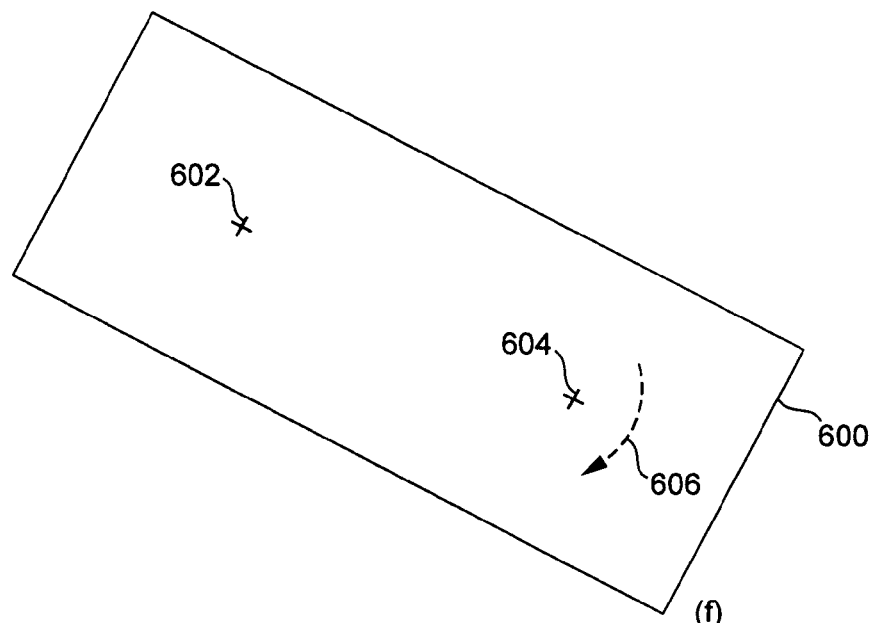

This cropping operation manipulation can be further understood with reference to FIG. 6. FIG. 6a generally illustrates an object denoted by reference numeral 800. A cross 802 denotes the position of a first contact point, and a cross 804 denotes the position of a second contact point. The first and second contact points are coincident with the object 800. As denoted by arrow 806, the first contact point 804 is moving, due to movement of a pointing device on the interactive surface for example, and is moving in a direction towards the first contact point 802. As a result, as illustrated in FIG. 6b, the object 800 is cropped to form a new object 808. The side of the object from which the second contact point 804 is moving away is cropped.

If it is determined in step 514 that the movement of the second contact point is not towards the first contact point, or after completion of the cropping step 516, in a step 518 it is determined if the movement of the second contact point is away from the first contact point.

If it is determined in step 518 that the movement of the second contact point is away from the first contact point, then in a step 520 the object is split.

This split operation can be further understood with reference to FIG. 6. As illustrated in FIG. 6c, an object is generally denoted by reference numeral 700. A cross 702 denotes the position of a first contact point, and a cross 704 denotes the position of a second contact point. As denoted by arrow 706, the second contact point 704 is moving in a direction away from the first contact point 702. As a result, and as illustrated in FIG. 6d, the object 700 is split into two parts, about a line which passes through the position of the first contact point 702. Thus the object 700 of FIG. 6c is split into a first part 710 and a second part 708.

If it is determined in step 518 that the movement of the second contact point is not away from the first contact point, or after splitting the object in step 520, in a step 522 it is determined if the movement of the first contact point is around the second contact point. If there is no such movement, then in a step 524 the process ends. If such movement is detected, then in a step 526 the object is rotated about the first contact point.

This rotating operation is illustrated further with reference to FIG. 6. As illustrated in FIG. 6e, an object is generally denoted by reference numeral 600. A first cross 602 denotes the position of a first contact point, and a second cross 604 denotes the position of a second contact point. An arrow 606 denotes movement of the contact point 604 about the position of the first contact point 602. As a result, as illustrated in FIG. 6f, the object 600 is rotated about the first contact point position 602 in accordance with the direction of motion of the second contact point.

In the examples described hereinabove, the first contact point is detected as providing a pressure value, and provides an anchor point for manipulation of the image. The detected pressure value may be non-zero, or determined as being above a threshold. Any appropriate technique for determining a pressure value may be used. Once the object is anchored by detection of the pressure associated with the first contact point, the second contact point determines the manipulation that is applied to the object. This can be as a result of the second contact point being stationary, moving, or moving in a particular direction. One skilled in the art will appreciate that the described process may be implemented differently while remaining within the scope of the present invention. For example, the first contact point may provide no pressure value, and the manipulation of the object be determined by detection of a pressure value associated with the second contact point.

In any arrangement, the speed at which the manipulation of the image takes place may be dependent upon the amount of pressure applied. The pressure value at the anchor point may determine the speed. The function may be determined by the pressure at the anchor point, and the speed by the pressure at the further point.

In any arrangement, there may be a requirement that the pressure applied must reach a threshold in order for the image manipulation to take place. Alternatively, any non-zero value of pressure may allow for manipulation of the image to take place.

Figure 7:
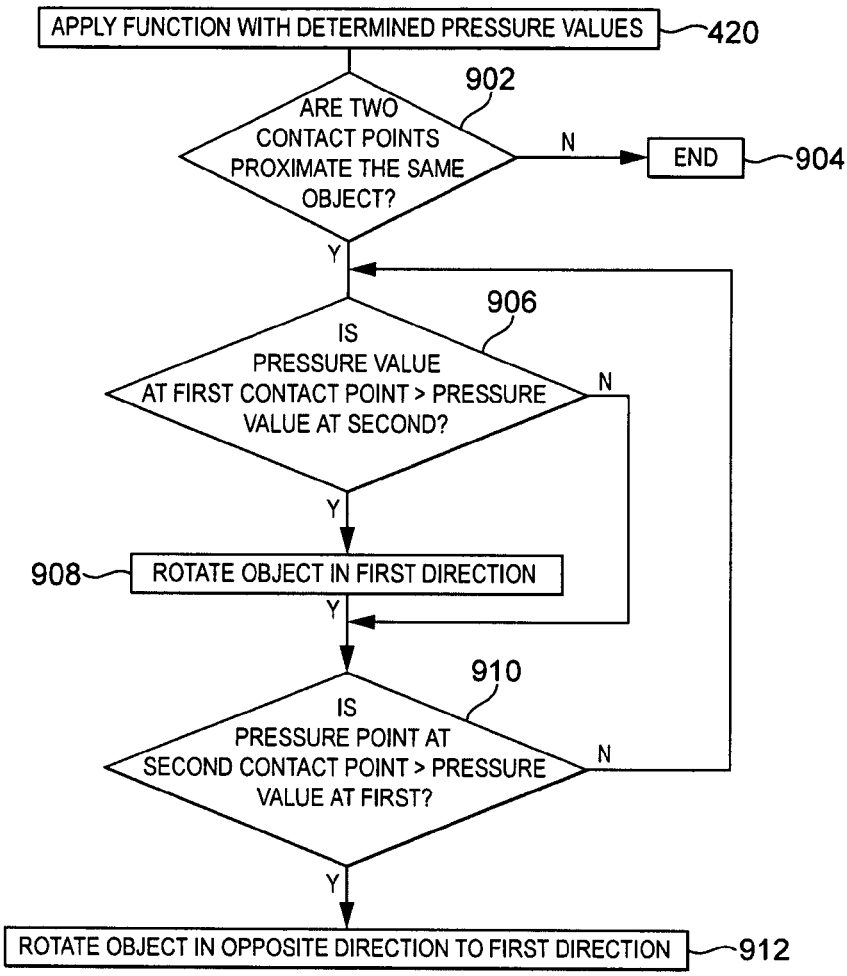
FIG. 7 illustrates a flow process for manipulating an object in accordance with an embodiment in which an interactive surface is adapted to detect at least two contact points and pressure values associated with the at least two contact points.
Figure 8:
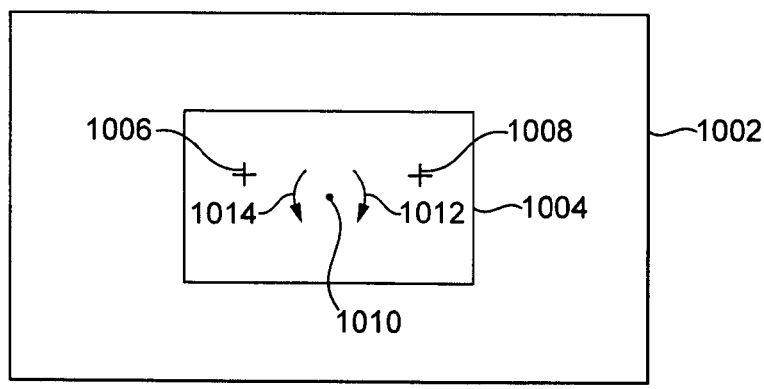
FIG. 8 illustrates the manipulation of an object in accordance with the exemplary flow process of FIG. 7.

With reference to FIGS. 7 and 8, an example implementation of the control of a software application in an embodiment where two contact points are detected and pressure data values for the two contact points are detected is described. In the example, the process originates from step 420 of FIG. 4, in which a function with determined pressure values is applied.

In step 902, it is determined whether the two contact points are proximate the same object. In a preferred embodiment, it is determined whether the two contact points are coincident with the same object. If the two contact points are not proximate the same object, then in a step 904 the process ends.

If the two contact points are proximate the same object, then in a step 906 it is determined whether the pressure value at a first contact point is greater than the pressure value at a second contact point.

If the pressure value at the first contact point is greater than the pressure value at the second contact point, then in step 908 the object is rotated in a first direction.

Thereafter, or after it is determined that the pressure value at the first contact point is not greater than the pressure value at the second contact point in step 906, in a step 910 it is determined whether the pressure value at the second contact point is greater than the pressure value at the first contact point. If it is not, then the process returns to step 906. If the pressure value at the second contact point is greater than the pressure value at the first contact point in step 910, then in step 912 the object is rotated in the opposite direction to the first direction. It is inherent to the process flow that in the event that the pressure values at the first and second contact points are equal, no rotation takes place.

The flow of FIG. 7 can be further understood with reference to FIG. 8, which illustrates an exemplary implementation. In FIG. 8 there is illustrated an object 1004 on display 1002. A first cross 1006 represents the location of a first contact point, and a second cross 1008 represents the location of a second contact point. A dot 1010 represents the centre of the object 1004. In this example, in the event that the pressure at the contact point 1008 is greater than that at the contact point 1006, then the object 1002 is rotated in a clockwise direction about the centre point 1010, as denoted by the direction of the arrow 1012. In the event that the pressure at the contact point 1006 is greater than the pressure of the contact point 1008 then the object 1004 rotates about the centre point 1010 in a counter-clockwise direction as denoted by the arrow 1014.

Thus in accordance with the example implementation described, two pressure values from two contact points located proximate or coincident with the displayed object can be used to manipulate the object. Preferably manipulation is to rotate the object as described. Alternatively, the two pressure values may be used to manipulate the object in different ways. Exemplary different ways are now further discussed with reference to FIG. 9 and FIGS. 10a to 10c.

Figure 9:
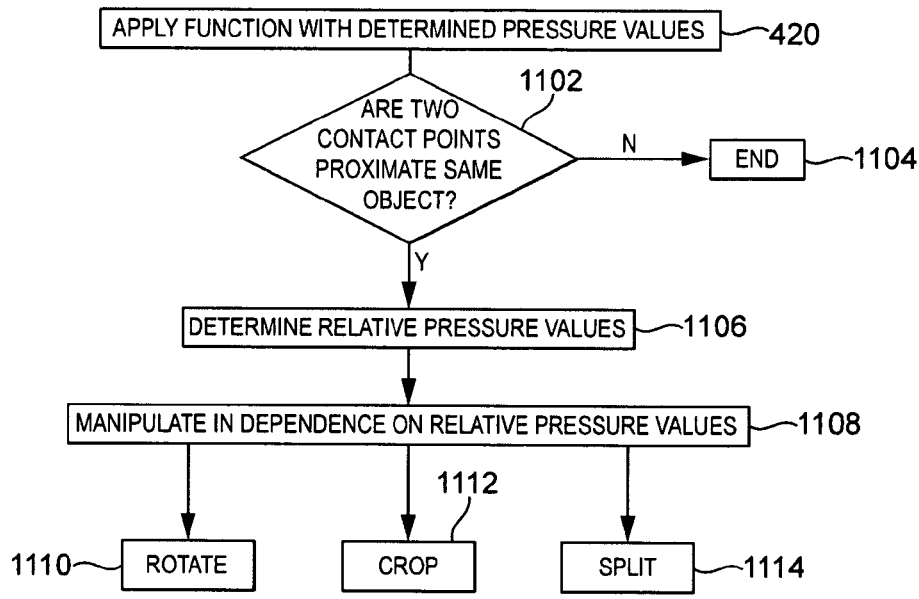
FIG. 9 illustrates a flow process in an embodiment for manipulating a displayed object on the interactive surface responsive to detection of two contact points and pressure values associated with the two contact points.

With reference to FIG. 9, the process begins from step 420 of FIG. 4, where it is determined to apply a function based on pressure values from two or more contact points.

In a step 1102, it is determined whether the two contact points are proximate the same object. Preferably it is determined whether the two contact points are coincident with the same object. If it is determined that the contact points are not proximate the same object, then in a step 110 the process is terminated.

If it is determined that the two contact points are proximate the same object, then in a step 1106 it is determined the relative pressure values associated with the two contact points. In other words, it is determined which contact point is associated with the greater pressure value. It may also be determined by the scale of the difference between the two pressure values.

Thereafter in a step 1108, the object to which the two contact points are proximate is manipulated in dependence upon the relative pressure values. As illustrated in FIG. 9, three exemplary manipulations of the object are to rotate the object in a step 1110, crop the object in a step 1112, or split the object in a step 1114.

Figure 10A:
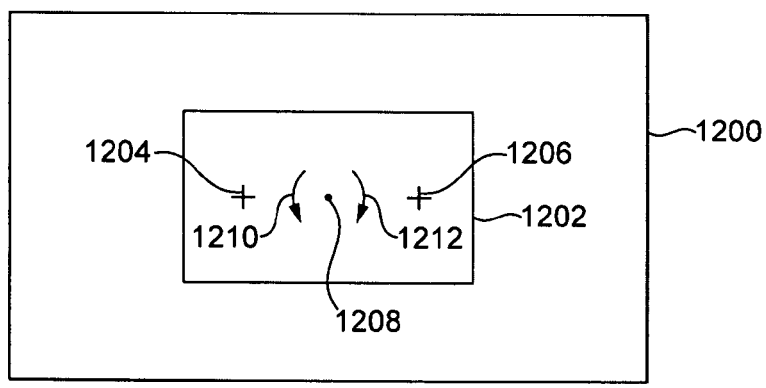
FIGS. 10(a) to 10(c) illustrate the manipulation of an object in accordance with the flow process of FIG. 9.

With reference to FIG. 10a, there is illustrated an example implementation of rotating the object in accordance with the process of FIG. 9. There is illustrated a display 1200 including an object 1202. A cross 1204 denotes the position of a first contact point, and a cross 1206 denotes the position of a second contact point. A dot 1208 denotes the centre point of the object 1202. In accordance with an embodiment of the invention, the object 1202 is rotated either in a clockwise direction as denoted by arrow 1212, or a counter-clockwise direction as denoted by arrow 1210, about it's centre point. The direction of rotation is dependent upon the relative pressure values of the contact points 1204 and 1206. For example in the event that the pressure at the location 1206 is greater than that at the location 1204, the object 1202 may be rotated clockwise. In the event that the pressure of the location 1204 is greater than that of the location 1206, then the object may be rotated counter-clockwise. In an arrangement in which in step 1106 of FIG. 9 it is not only determined which of the pressure values is the highest, but the relative difference of the pressure values is also determined, the speed of rotation may be controlled by the relative difference of the two pressure values.

Figure 10B:
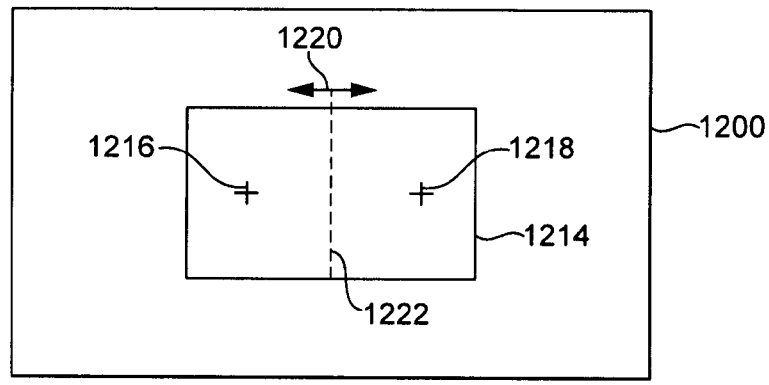

With reference to FIG. 10b, there is illustrated an example implementation for splitting an object in accordance with the process of FIG. 9. An object 1214 is displayed on a display 1200. A cross 1216 denotes the position of a first contact point, and a cross 1218 denotes the position of a second contact point. A dash line which is generally perpendicular to a line joining the first contact points 1216 and 1218 represents the point at which the object will be split. As denoted by arrow 1220, the dash line 1222 moves in the direction of either the first contact point 1216 or the second contact point 1218. The movement of the dash line 1222 is determined by the relative pressure between the two contact points. Thus a pressure contact point 1216 which is higher than that of point 1218 may result in the dash line 1222 moving towards the contact point 1216 (or in an alternative implementation, away from the contact point 1216). In the alternative, a higher pressure at the contact point 1218 relative to the contact point 1216 may pull/push the dash line 1222 towards or away from the contact point 1218. In this way the relative pressure values at the two contact points denote the point at which the object 1214 is split.

Although in the example of FIG. 10b the split line is shown as a straight line, in alternative arrangements it may be of a different shape. The split operation may take place when, for example, the pressure values at one or both contact points 1216 and 1218 is maintained constant for a particular period of time, or when the two contact points are simultaneously detected as being removed, or responsive to some other control input.

Figure 10C:
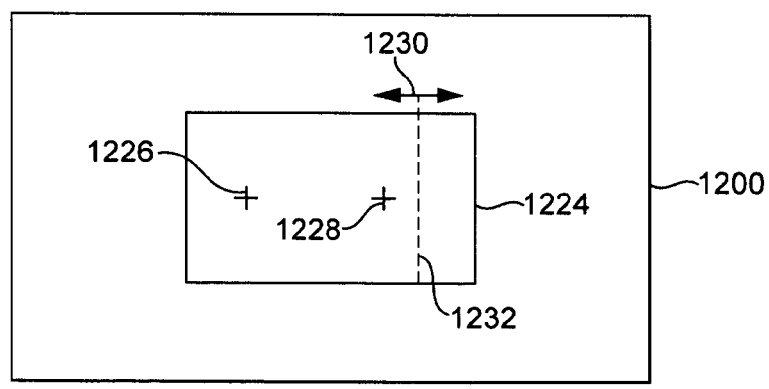

With reference to FIG. 10c there is illustrated the implementation of an example in which an object is cropped in accordance with the process of FIG. 9.

With reference to FIG. 10c, there is illustrated a display 1200 including an object 1224. A cross 1226 denotes the position of a first contact point, and a cross 1228 denotes the position of a second contact point. A dash line 1232 extends in a direction generally perpendicular to the direction of a line which intersects the first and second contact points 1226 and 1228. The dash line is movable as denoted by arrow 1230. The position of the dash line 1232 is determined by the relative pressure at the contact points 1226 and 1228. Thus the dash line 1232 is moved away and toward an edge of an object in dependence upon the relative pressure of the two contact points. For example, in the event that the pressure of the contact point 1228 is greater than that of 1226, the dash line may move towards the edge of the object 1224 which is nearest to the contact point 1228. In the event that the pressure of the contact point 1226 is greater than a contact point 1228, then a dash line 1232 may move away from the edge. The dash line 1232 may define the location at which the object 1224 is cropped. As in FIG. 10b, the crop operation may be triggered by the pressure values remaining unchanged for a certain period of time, or by removal of the contact points, or by some other means.

One skilled in the art will understand that various additional applications may be implemented using the above-mentioned techniques. In general, a software function, or a condition or state of a software function, is defined by the detection of at least one pressure value with two contact points, or two or more pressure values (or their relative values) with two or more contact points.

Further example implementations in accordance with embodiments of the invention are described with reference to FIGS. 11 to 17. In these example implementations the value of pressure associated with a contact point is used to define an active region about the associated contact point, the size of the active region being dependent upon the pressure value associated with the contact point. The active region may be a physical region of the display, may be a physical area of the display, may be a path along a portion of the display, or other region within which active elements associated with the display may be captured. These embodiments of the invention can be further understood with reference to the following examples.

Figure 11:
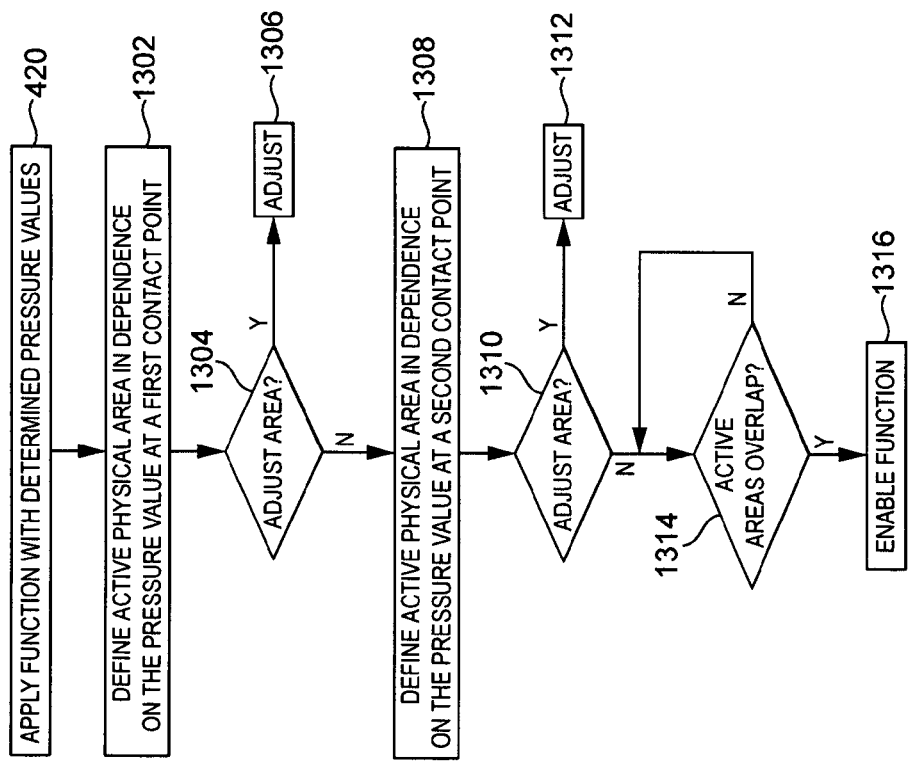
FIG. 11 illustrates an exemplary flow process for controlling a software application in an embodiment of the invention.

With reference to FIG. 11, the process starts from step 420 of FIG. 4, in which it is determined to apply a function associated with multiple pressure values.

In a step 1302, a physical area is defined in dependence upon a pressure value associated with a first contact point. After the physical area is defined, in a step 1304 the pressure value is monitored in order to determine whether the area should be adjusted. The process for adjusting the area in step 1304 is described hereinbelow with reference to FIG. 12. If in the event that it is determined to adjust the area, because the pressure value detected has changed, then the adjustment of FIG. 12 takes place in a step 1306.

Figure 12:
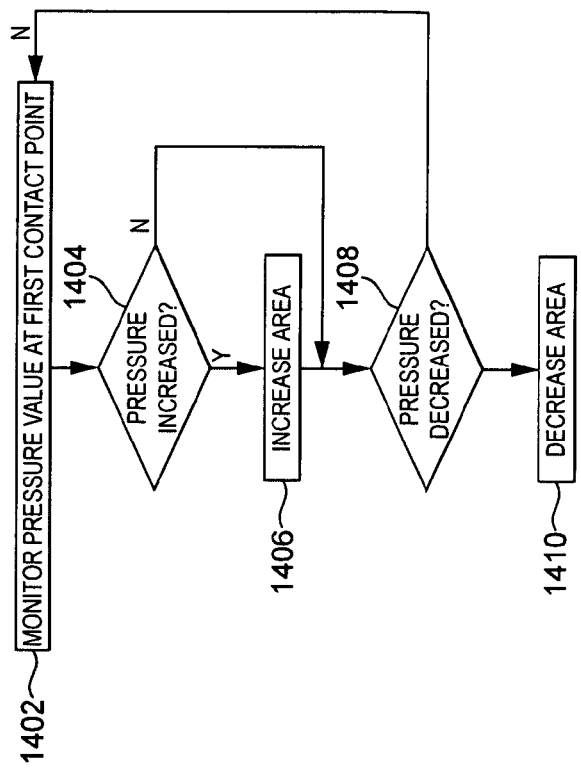
FIG. 12 illustrates a flow process for adapting the control of a software application in accordance with a modification of the flow process of FIG. 11.

With reference to FIG. 12, in the adjustment step the pressure value at a given contact point is monitored in the step 1402. If it is detected in a step 1404 that pressure has increased, then in a step 1406 the area associated with the pressure value is increased. Thereafter, or in the event that pressure has not increased in step 1404, in a step 1408 it is determined whether pressure has decreased. If pressure has not decreased then the process returns to step 1402. If pressure has decreased then in step 1410 the area associated with the contact point is decreased. Increasing or decreasing the area associated with a pressure value may increase or decrease a physical region of the display around the contact point; increase or decrease the size of a path or paths extending from the contact point along a portion of the display; or increase or decrease the number of active elements on the display proximate the contact point captured.

Returning to FIG. 11, following step 1304 in a step 1308 there is defined a second physical area in dependence on the pressure value detected at a second contact point.

Figure 14:
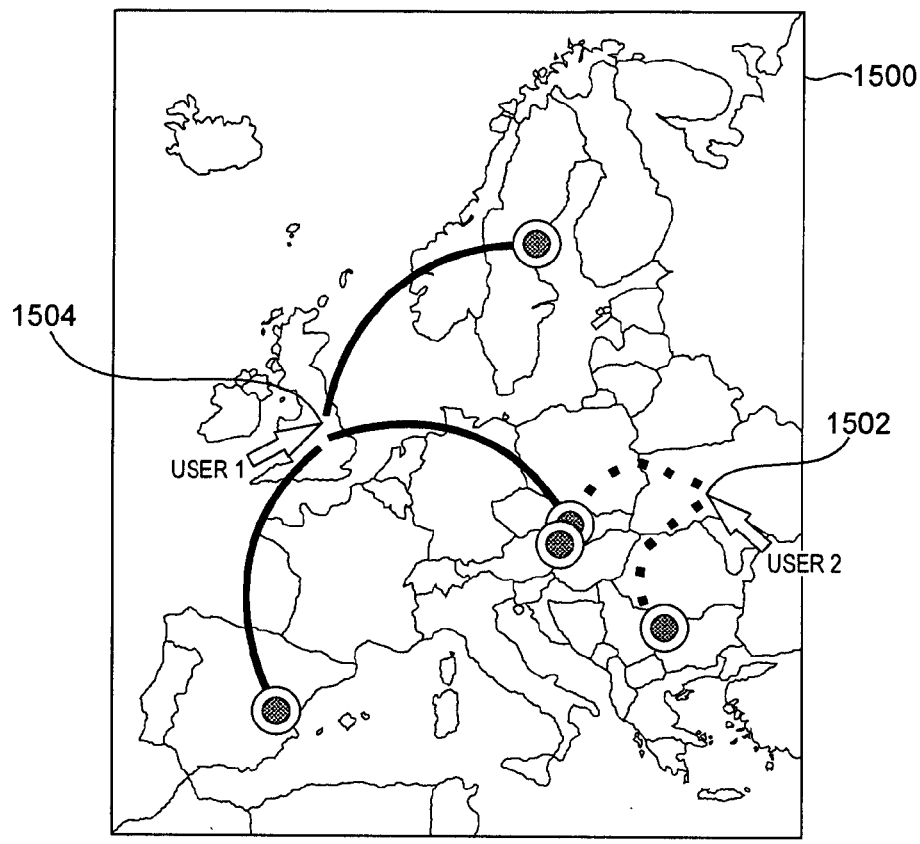
FIG. 14 illustrates an example implementation of the flow process of FIGS. 11 and 12.

In a step 1310 it is determined whether to adjust the area in dependence upon varying pressure. If the area is to be adjusted, then in a step 1312 the process of FIG. 14 is implemented for the second contact point.

Thereafter in a step 1314 it is determined whether the areas defined for the first and second contact points overlap. In the event that the areas do not overlap, then the process continues to monitor for overlap in step 1314, in dependence upon the areas being varied by varying of pressure. If in step 1314 it is determined that the areas do overlap, then in a step 1316 a function is enabled in dependence upon the overlap. The function may be dependent upon a software application currently being run, or may be a function selected by the user in the software application.

The overlap may be an overlap of: defined physical regions of the display; defined paths extending from the respective contact points; or defined active elements on the display.

Figure 13:
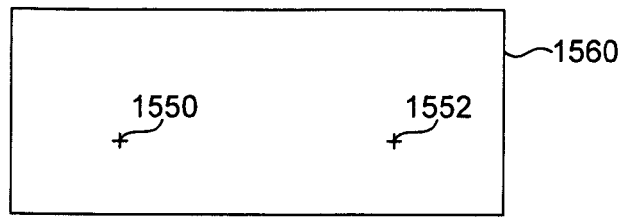
FIGS. 13(a) to 13(c) illustrates an example implementation of the flow process of FIGS. 11 and 12.
Figure 13:
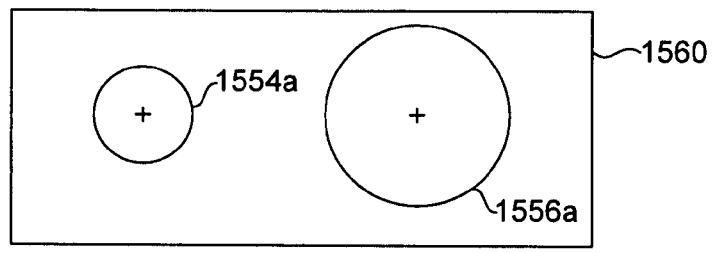
Figure 13:
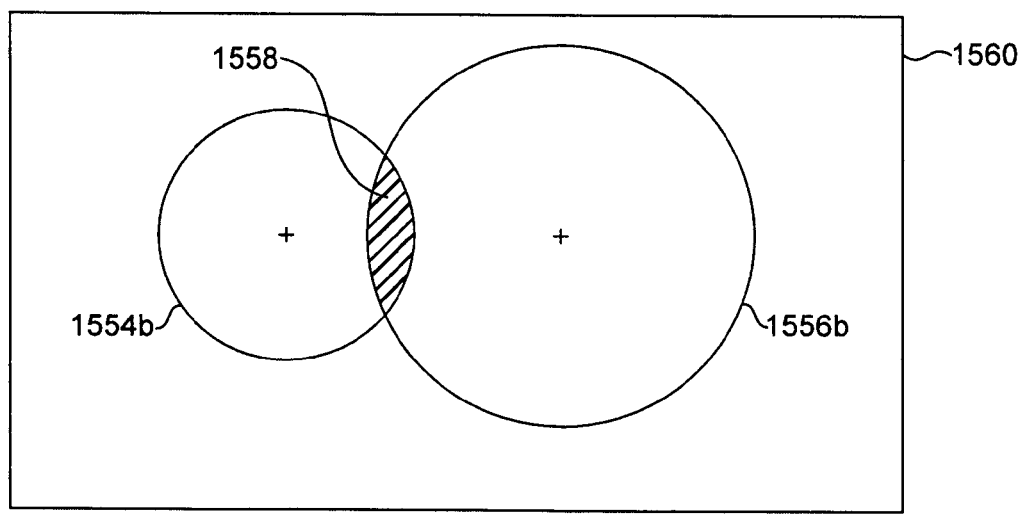

With reference to FIG. 13, the general concept of this embodiment of the invention relating to the defining of areas is further illustrated with respect to a simple example.

FIG. 13a generally illustrates a first contact point 1550 and a second contact point 1552 on a display area 1560. As illustrated in FIG. 13b, in dependence upon the pressure value detected at each of the contact points 1550 and 1552, an area is defined. Thus at the first contact point 1550 an area in a circular shape denoted by a circumference 1554a is defined around the contact point 1550. Similarly for the contact point 1552, a circular area having a circumference 1556a is defined around the second contact point 1552. The circular areas may be displayed on the display in an opaque manner, or as solid circles. In general, it will likely be required that some visual indication of the size of the circles be given, without obscuring from view underlying objects or information.

As can be seen in FIG. 13b the circular area defined at the first contact point is smaller than that defined at the second contact point, which results from a smaller pressure being applied at the first contact point than at the second contact point. The pressure values at the contact points may vary.

As illustrated in FIG. 13c, the areas defined at the two contact points may overlap. It can be seen in FIG. 13c that the area associated with the first contact point 1550 has increased to have a circumference 1554b, and the area associated with the second contact point has been increased to have a circumference 1556b. The two circular areas intersect in a region denoted by reference numeral 1558.

In accordance with step 1316 of FIG. 11, when it is determined in step 1316 that the two areas 1554b and 1556b overlap, this triggers a software function to be enabled or a state within a software function to be changed. In a further adaptation of this technique, the software function that is enabled or the state which is changed may be dependent upon the size of the overlap.

Figure 15:
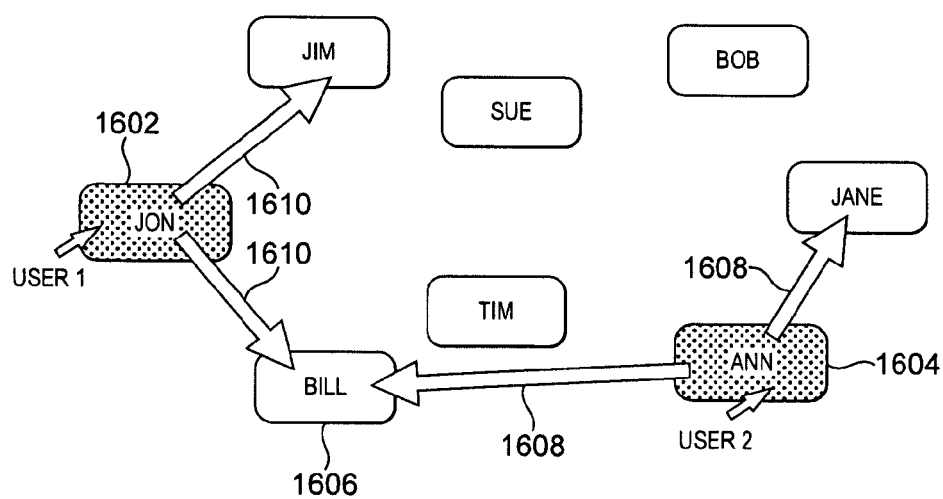
FIG. 15 illustrates an example implementation of the flow process of FIGS. 11 and 12.
Figure 16:
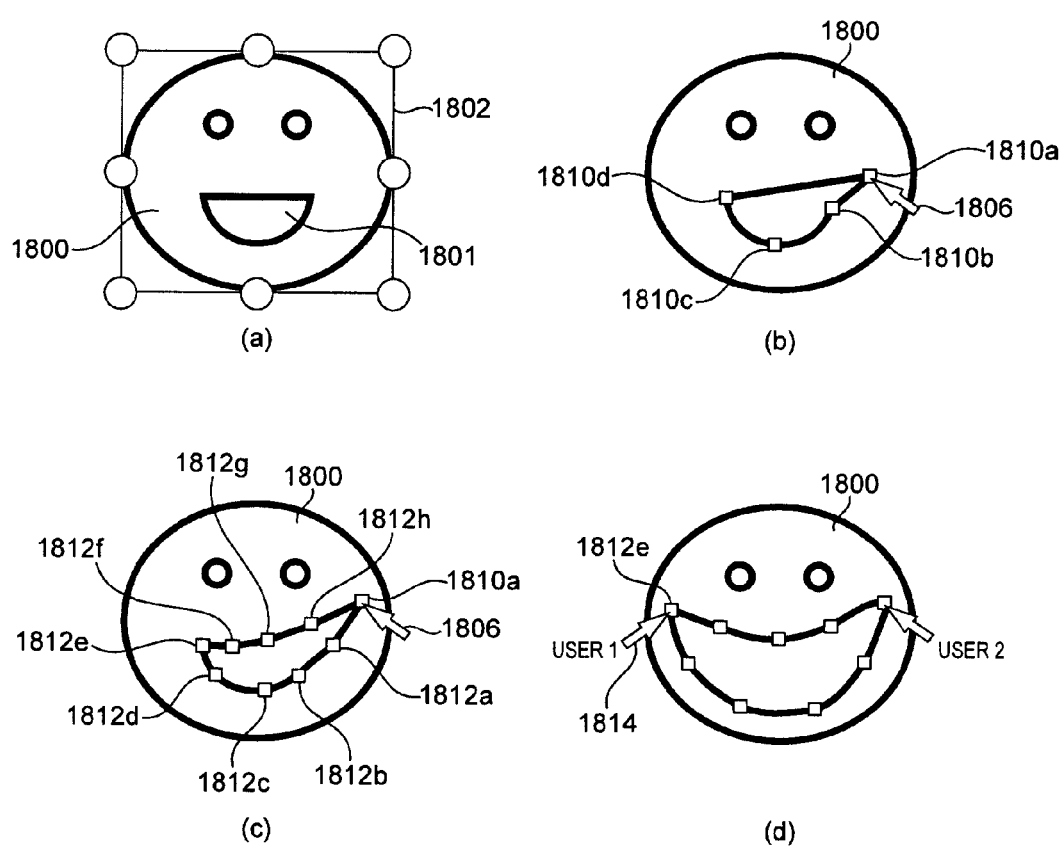
FIGS. 16(a) to 16(d) illustrate an example implementation of the flow process of FIGS. 11 and 12.

FIGS. 14 to 16 illustrate example implementations of the embodiments of FIGS. 11 to 13.

FIG. 14 illustrates a map 1500. A first user places a pointing device at a first contact point 1504, and a second user places a second pointing device at a second contact point 1502. In a software application associated with the displayed map, the contact points for the respective users represent geographical locations within the map. Each user applies pressure with their pointing device, such that an area such as the areas illustrated in FIGS. 13b and 13c are created. This may be represented on the display, for example, by an opaque circle being formed around the respective contact point. In this application, the purpose is for each user to identify destinations that they may wish to fly to from the locations representing their current positions. As the associated areas increase to encompass locations at which it is known flights can be provided to from their current destination, these locations may be highlighted. Further, as the two users encompass common locations within their respective areas, which common locations provide flights from both the locations of the first and second users, then these locations are highlighted. These indicate locations which a user at either of the locations associated with the first and second contact points could fly from to meet at a common point.

As the user associated with contact point 1504 applies increasing pressure, destinations which it is possible to fly to from the location of contact point 1504 are highlighted. Thus rather than a physical area—such as a circular area—being displayed over the map, representing applied pressure, locations which can be flied to are highlighted, which fall within a nominal physical area represented by the applied pressure. Thus the application may select the destinations to be highlighted in dependence on them being included within a certain radius of the contact point, which radius varies in accordance with applied pressure, but which radius (or associated circle) may not be visually represented on the display. In accordance with the applied pressure at contact point 1510, destination locations 1510, 1512, and 1514 are highlighted. Similarly, for contact point 1502, in accordance with applied pressure destination locations 1516 and 1518 are highlighted. The destination locations for the contact point 1504 may be displayed in a different colour to those for contact point 1502. Further, when a common destination location is selected in dependence on the applied pressure from both contact points 1504 and 1502, that destination location may be highlighted in a third colour. Thus the location 1514 for the first contact point, and the destination 1518 for the second contact point 1502, which are the same location, may be displayed on the map in a third colour. Thus the selection of a point on the map by both contact points, in dependence on their applied pressure, results in that point being highlighted as a common selection.

The flight data necessary to highlight the possible destinations from a contact point as the potential destination widens out according to pressure, may be provided by the software application controlling the operation accessing flight information via the Internet.

With reference to FIG. 15, there is illustrated a further example. Illustrated in FIG. 15 is a number of blocks, each associated with various names, displayed on the interactive display surface. Each block represents a data set associated with a named user. The data sets may, for example, be the results of a set of questions that each user has answered. These answers may have been acquired by a learner response system connected to the interactive display system.

A first user may select one data set, and a second user may select a second data set. Thus a first user may select the data set associated with the user "Jon" denoted by reference numeral 1602 using a pointing device. A second user may select a data set associated with the user "Ann" represented by reference numeral 1604 using a pointing device. As each user applies pressure to their respective pointing device, at the respective contact points, an area around the contact point increases (which area may not be displayed as a region). As that area encompasses other users, users that have data sets that correspond to the originating data set are highlighted. In the example of FIG. 15, this highlighting is achieved by arrows, such as arrows 1608 associated with a second data set 1604 pointing to data sets "Jane" and "Bill", and arrows 1610 associated with the first data set 1602 pointing to data sets "Jim" and "Bill".

In effect, as the pressure is increased at a point, for example at the point coincident with data set "Jon" 1602, the number of neighbouring data sets compared to the selected data set is increased. Thus initially data sets "Jim" and "Bill" are captured and compared, then as pressure increases the date sets "Tim and "Sue" are captured and compared. There is no necessity for a circular region to be displayed: as the pressure increases, the next closest data sets are captured. This might be visibly indicated to the user by changing the colour of a captured data set to match the colour of the data set at which the first contact point is made. For another contact point, captured data sets may be highlighted in a different colour. Thus based on an initial contact point, the area within which data sets are captured is increased as pressure is increased, any data set falling within a nominal increasing physical area being captured by the increased pressure.

In accordance with the preferred embodiment of the invention, in the event that the areas defined around each contact point overlap, such that within the overlapping area there is a data set which is common to both the first and second users, then that data set may be highlighted. Preferably such commonly selected data is highlighted in a third colour.

For two data sets to be identified as having common answers, it may be necessary for them to have an exact match, or to have a match which exceeds a certain threshold, such as for example 80% of the data matching. The thresholds may be adjustable.

In an alternative example, the arrangement of FIG. 15 may be adapted such as to compare a selected data set with all data sets in a group, the applied pressure being used to adjust the threshold used to determine a match. Thus in the example of FIG. 15, a user applying pressure at data set 1602 results in a comparison being made with all data sets shown in the Figure (which are all objects of the same software application). The pressure value is used to determine the threshold. As further pressure is applied, the threshold may be reduced to potentially incorporate more data sets which can be considered as having common data. Similarly for a pointing device selecting data set 1604, the threshold can be adjusted. Once again, data sets which are common to both contact points can be highlighted if they match within thresholds.

With reference to FIG. 16, a further example in accordance with an embodiment of the invention is described. In this example, the active region extending from each contact point is a path extending from the contact point. The size of the path is dependent upon the applied pressure at the contact points. The path preferably defines a set of one or more control points. Preferably the point of contact is a main control point of the set of control points. In a preferred embodiment, as pressure is applied at the contact point, the length of the path extends to encompass one or more control points adjacent the main control point. The path may be defined by the control points. Preferably the number of selected control points adjacent to the main control points are proportional to the pressure applied at the contact points. As the pressure detected increases, the next adjacent control point to the last selected control point may be included in the set. In an exemplary arrangement, an area is defined by the value of detected pressure, such as a circular area, and any control points within the area are included within the set. Thus a set of control points may be defined by a path, by multiple paths, or by an area.

With reference to FIG. 16, an example implementation in accordance with an exemplary embodiment is described.

FIG. 16a illustrates an object 1802 comprising a "face shape" image 1800, including a mouth 1801. FIG. 16b illustrates an example of a typical prior art manipulation of the mouth 1801 of such a face shape image. As illustrated in FIG. 18b, the mouth 1801 of the face shape 1800, for the purposes of illustration, has four control points, denoted 1810a to 1810d. One control point 1810a is in the right corner (looking at the page) of the mouth, one control point 1810d is in the left corner of the mouth, and two control points 1810c and 1810d are along the lower lip of the mouth. A pointing device represented by arrow 1806 is positioned at the control point 1810a. The pointing device is moved to move the control point 1810a in order to alter the shape of the mouth. In this example the movement is to alter the shape of the right side of the mouth upwards. As illustrated in FIG. 16b, as a result of the movement of the pointing device 1806, the control point 1810a is moved in a corresponding movement. The remaining control points 1810b to 1810d are unaffected and remain in their original positions. As such the resulting mouth shape has an unnatural appearance. In order to make the mouth shape more natural, the pointer 1806 would need to be used to select and move one or more other control points, such as control points 1810b.

With reference to FIG. 16c, there is illustrated an arrangement in which pressure is applied using the pointing device 1806 at a control point, to improve the manipulation of the image. In dependence upon the applied pressure, a number of control points adjacent the original contact control point 1810a are included within the action resulting from the subsequent movement of the pointing device 1806. In FIG. 16c a larger number of control points on the mouth of the face shape are illustrated. Thus there are contact points 1812a to 1812h in addition to the original contact point 1810a. As the control point 1810a is moved by the pointer 1806, then there is corresponding movement of adjacent control points. As can be seen in FIG. 18c, this results in control points along two control paths, one formed by the upper lip of the mouth of the face shape, and one formed by the lower lip of the mouth of the face shape being affected by the movement of the main control point 1810a. In the preferred arrangement, the pressure applied at the control point 1806 determines the number of control points which are selected to be moved, and the further away from the main control point that the individual control points which are selected at located, the less movement is applied. This results in a more natural shape of the mouth being formed by the movement of a single control point. In the prior art, in order to obtain equivalent movement of the mouth of the face shape, there would be a requirement for the pointing device to be located at multiple individual control points and each control point individually moved, in a 'trial' and 'error' manner.

With reference to FIG. 16d, there is illustrated an arrangement in which a second pointing device, represented by arrow 1814, is positioned at a second control point 1812e. In a preferred arrangement, the two contact points associated with the first and second pointing devices are located at main control points positioned at opposite corners of the mouth of the face shape. Combined pressure data from the two pointing devices is processed to manipulate the control points of the shape which are located between the two contact points.

Figure 17:
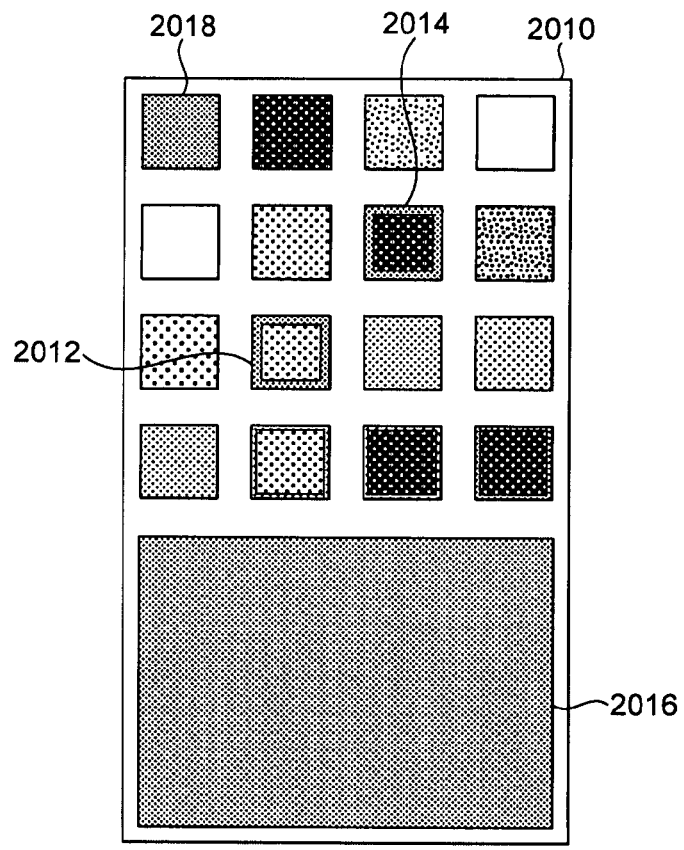
FIG. 17 illustrates an example implementation in accordance with the flow process of FIGS. 13 and 14.

With reference to FIG. 17, there is illustrated a further example for using a combination of pressure values detected at two contact points in order to define the condition of software function. This example relates to the mixing of colours.

As illustrated in FIG. 17, there is provided a colour palette 2010. The colour palette includes icons representing a number of individual colours, in this example 16 colours, including a first colour 2014 and a second colour 2012. There is further illustrated a larger icon 2016 which represents the current colour selected. In accordance with the exemplary arrangement, a first pointing device is positioned at the first colour icon 2014, and a second pointing device is positioned at the second colour icon 2012. Pressure is applied with one or both pointing devices. The two colours represented by the two selected icons are then mixed, in an amount proportional to the pressure applied at each individual colour, to generate a mixed colour which is displayed in the icon 2016. As the pressure at each contact point varies, the colour displayed in the icon 2016 representing the current colour varies. The user then applies different pressure to each individual colour until their desired colour is displayed in the icon 2016.

This is functionally equivalent to the other examples described above. In the examples above, where two 'regions' overlap, the extent or proportion of the overlap is dependent upon the pressure applied at each contact point. In this example, the extent or proportion of the mixture of two colours is dependent upon the pressure associated with each individual colour.

In the colour palette example, if the pressure applied at the first contact point is twice that of the pressure applied at the second contact point, then the colour is mixed at a ratio of the colour at the first contact point to the colour at the second contact point of 2:1.

The thus formed new colour may then be stored as a set colour on the palette 2010, for example in colour icon 2018.

In a further embodiment of the invention, which may be considered a modified generalisation of the example of FIG. 17, the effect of a detected pressure value at one contact point is dependent upon the pressure value at another contact point. This is illustrated with respect to the flow process of FIG. 18.

Figure 18:
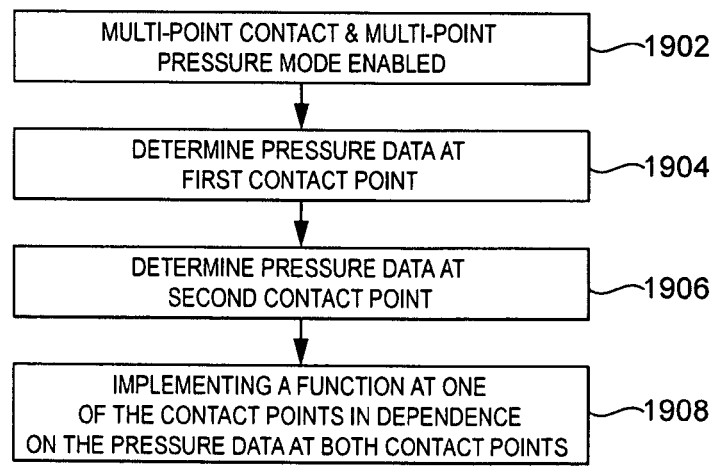
FIG. 18 illustrates a flow process for adapting the control of the manipulation of a software application.

With reference to FIG. 18, in a first step 1902 it is determined whether a multi-point contact and multi-point pressure mode is enabled. In a step 1904 the pressure value at a first contact point is determined. In a step 1906 the pressure value at a second contact point is determined. In a step 1908 a function is then implemented, preferably at one of the contact points but alternatively at a separate location, in dependence on the pressure data at both contact points.

In one example, a function may be implemented at one contact point by adding together the two pressure values in order to determine a control variable for the function to be enabled. Thus the contact point at which the function is enabled may be associated with an object, and the object may be manipulated in accordance with the pressure value of both contact points.

In another example, a function may be implemented at a given location or in a given application in dependence upon two pressure values at two contact points. As described with reference to FIG. 17, this may be the creation of a new colour from pressure applied to two selected colours.

In an alternative, a function may be enabled at the first contact point only in dependence upon a particular pressure value being determined at the second contact point.

A further exemplary implementation includes displaying a Bezier curve on the display, including displaying two control points of the Bezier curve. A contact point at each of the control points is detected. A pressure value at each of the control points is detected. The control points are then varied in dependence on the respective detected pressure.

The invention also provides for a method of controlling a software application running on a computer system including an interactive display adapted to detect the position of at least one contact point on the surface of the interactive display. Such method comprises: detecting a pressure value at the at least one contact point; monitoring the pressure value at the at least one contact point; and responsive to a pressure value being constant for a predetermined period of time, setting a software state.

In an example, a pointing device having a contact point on a line is pressed on the surface to increase applied pressure. As the pressure varies, the thickness of the line varies. When a desired thickness is reached, the user may hold the pointing device with a constant pressure for a certain amount of time, and as a result the line thickness is then fixed at the desired thickness. In this way, therefore, a parameter is varied by varying the applied pressure. When a desired value of the parameter is reached, which may be represented visually by an effect of the varying pressure, holding the pressure constant for a fixed time period may fix the parameter value at that value.

The software state may be a software function or value. The software state may thus be set to a value associated with the value of pressure detected for the predetermined time. The pressure value may be proportional to the value set.

Setting the software state may comprise releasing the software state from a current set value. Setting the software state may comprise detecting a value of pressure for the predetermined time which is proportional to the current set value.

The parameter may be released from the fixed value, by holding the pointing device applying the same pressure for a fixed period of time, following which the parameter value is 'unlocked'.

Thus a pointing device is placed on a displayed line, and increasing pressure applied. A desired line thickness is reached. The applied pressure is applied for a predetermined time. The pointing device is then removed and the desired line thickness is retained or locked. To unlock the desired line thickness, pressure is applied on the line until a value is reached which corresponds to the current 'locked' thickness. This may be represented visually by the appearance of the line changing when the value is reached. The pressure is then applied for a predetermined time, following which the line thickness is released.

Figure 19:
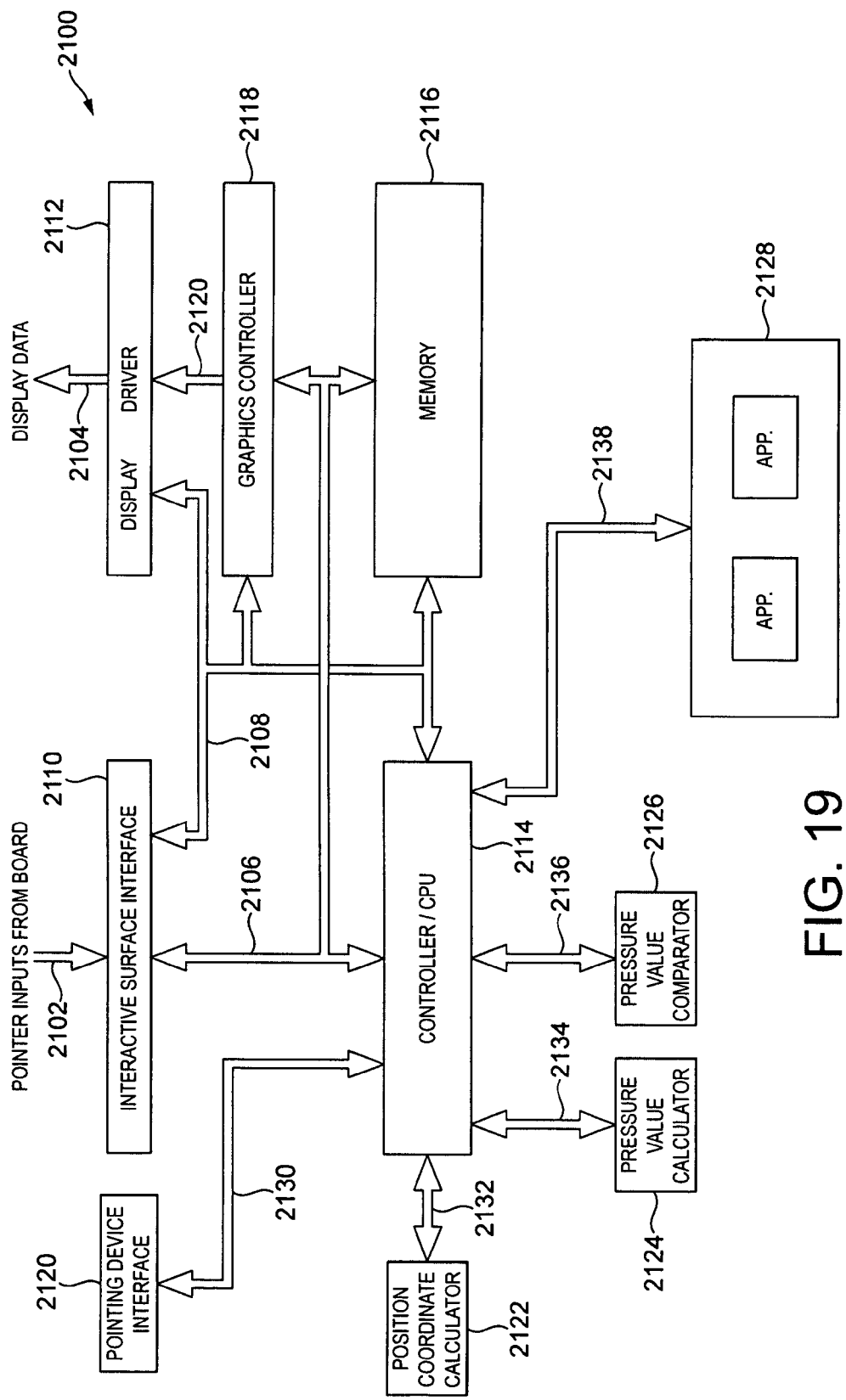
FIG. 19 illustrates a computer processor architecture for implementing any process as described herein in an interactive display system including an interactive surface.

The main function elements for the computer system for implementing the preferred embodiments of the invention is illustrated in FIG. 19. The invention may be implemented in conventional processor based hardware, adapted to provide a necessary functionality to implement preferred embodiments of the invention. FIG. 19 illustrates the main functional elements, and does not illustrate the complete functional elements in order to implement the computer functionality.

The main functional elements 2100 comprise a controller or CPU 2114, a memory 2116, a graphics controller 2118, an interactive surface interface 2110, and a display driver 2112. All of the elements are interconnected by a control bus 2108. A memory bus 2106 interconnects the interactive surface interface 2110, the controller 2114, the memory 2116, and the graphics controller 2118. The graphics controller provides graphics data to the display driver 2112 on a graphics bus 2120.

The interactive surface interface 2110 receives signals on bus 2102, being signals provided by the interactive display surface comprising data from contact points or pointer inputs. The display driver 2112 provides display data on display bus 2104 to display appropriate images to the interactive display surface.

The controller/CPU 2114 communicates with a pointing device interface 2120 via interface 2130, in an arrangement where data, such as pressure data, is communicated directly from the pointing device to the controller/CPU 2114.

The controller/CPU 2114 communicates with a pressure value calculator 2124 via interface 2134, which may calculate pressure data in dependence on data received from the pointing device or interactive surface.

The controller/CPU 2114 communicates with a pressure value comparator 2126 via interface 2134, which may compare pressure data calculated for multiple contact points.

The controller/CPU 2114 communicates with a position coordinate calculator 2122 via interface 2132, which calculates the coordinates of contact points detected at the interactive surface.

The controller/CPU 2114 communicates with software application interfaces 2128 via interface 2138, to deliver data associated with contact points and pressure data, including instructions to control the state of a software application, to software application running under the control of the controller/CPU 2114.

As will be clear to those skilled in the art, numerous embodiments of interactive display systems incorporating interactive display surfaces may be used to practice the present invention, for example to run the methods described herein as part of interactive display applications. The interactive display applications may be stored on a disk (for example a CD or other data storage media) and downloaded into a computer's memory to be run or run from disk. Alternatively, the interactive display applications may be accessed over a network connection such as to a central server or the internet.

The invention may be embodied as a computer program code being executed under the control of a processor of a computer system. The computer program code may be stored on a computer program product. A computer program product may be included in a computer memory, a portable disk or portable storage memory, or hard disk memory.

The invention is described herein in the context of application to a computer system forming part of an interactive display system. It will be understood by one skilled in the art that the principles of the invention, and the embodiments described herein, are not limited to any specific interactive display system. The principles of the invention and its embodiments may be implanted in any interactive display system. The invention and its embodiments are not limited to the use of a pointer in combination with an interactive display system, and the invention and its embodiments equally apply to arrangements in which a touch-sensitive type surface arrangement is provided for the interactive display, or any other type of interactive surface is provided.

The invention has been described herein by way of reference to particular examples and exemplary embodiments. One skilled in the art will appreciate that the invention is not limited to the details of the specific examples and exemplary embodiments set forth. Numerous other embodiments may be envisaged without departing from the scope of the invention, which is defined by the appended claims.

What is claimed is:

1. A method of controlling a software application running on a computer system including an interactive display, the method comprising: displaying a Bezier curve on the display, including displaying two control points of the Bezier curve; detecting two contact points on the surface of the interactive display; detecting a pressure value at each of said contact points; defining an active region extending from each contact point, the size of each active region being dependent upon the detected pressure at each contact point; detecting an overlap of the defined active regions; determining control data associated with the contact points, wherein the control data is derived from a pointing device being a pen-type device providing the contact point; and defining a condition of the software application in dependence on:

(i) detection of said two contact points; (ii) the position data of the two contact points; (iii) the control data associated with the contact points; (iv) the pressure values associated with the contact points; and (v) the detected overlap.

2. The method of claim 1 wherein the control data is derived from the state of a switch of the pointing device.

3. The method of claim 1 wherein the control data is selection data.

4. The method of claim 1 wherein the condition defines a pivot point and a selected object is rotated by movement of the other contact point.

5. The method of claim 1 wherein the condition causes a selected image to be flipped.

6. The method of claim 1 wherein the condition causes a selected image to split in two.

7. The method of claim 1 wherein the condition causes a selected image to be cropped.

8. The method of claim 1, further comprising: enabling a software function in dependence upon the detected overlap.

9. The method of claim 1, wherein the effect of a detected pressure value at one contact point is dependent upon the pressure value at the other contact point.

10. The method of claim 1 further comprising: selecting an object displayed in dependence on the at least two contact points being coincident with said object; detecting pressure values from the contact points; and manipulating said object in dependence thereon.

11. The method of claim 1 further comprising: detecting the selection of two colour options at the at least two contact points; and generating a colour by mixing the selected colours in a ratio determined by the pressure values at the respective contact points.

12. A non-transitory computer-readable medium storing a program causing a computer to execute the method according to claim 1.

13. A computer system for controlling an interactive display, configured to: display a Bezier curve on the interactive display; detect two contact points on the surface of the interactive display being control points of the Bezier curve; detect the position of the contact points; detect a pressure value at each of said contact points; define an active region extending from each contact point, the size of each active region being dependent upon the detected pressure at each contact point; detect an overlap of the defined active regions, determine control data associated with the contact points, the control data being derived from a pointing device being a pen-type device providing the contact point; and define a condition of a software application running on the computer system in dependence on: (i) detection of said two contact points; (ii) the position data of the two contact points; (iii) the control data associated with the contact points; (iv) the pressure values associated with the contact points; and (v) the detected overlap.

* * * * *